US007844913B2

(12) United States Patent (10) Patent No.: US 7,844,913 B2
Amano et al. (45) Date of Patent: Nov. 30, 2010

(54) INFORMATION PROCESSING APPARATUS AND METHOD, AND PROGRAM

(75) Inventors: Ryoko Amano, Tokyo (JP); Koichi Sato, Tokyo (JP); Makoto Tabuchi, Tokyo (JP); Susumu Ijichi, Kanagawa (JP); Hajime Yoshimasu, Kanagawa (JP); Kaori Kashimoto, Kanagawa (JP); Koji Kobayashi, Tokyo (JP); Hiroyuki Masuda, Tokyo (JP); Kayoko Yamasaki, Kanagawa (JP); Ryuji Takenouchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 306 days.

(21) Appl. No.: 11/032,997

(22) Filed: Jan. 11, 2005

(65) Prior Publication Data

US 2005/0183026 A1 Aug. 18, 2005

(30) Foreign Application Priority Data

Jan. 13, 2004 (JP) ............................. 2004-005426

(51) Int. Cl.
 *G06F 3/048* (2006.01)
(52) U.S. Cl. ...................... 715/769; 715/764; 715/765
(58) Field of Classification Search .................. 715/531
 See application file for complete search history.

(56) References Cited

U.S. PATENT DOCUMENTS

| | | | | | |
|---|---|---|---|---|---|
| 5,202,828 | A | * | 4/1993 | Vertelney et al. | 715/236 |
| 5,606,674 | A | * | 2/1997 | Root | 715/769 |
| 5,754,178 | A | * | 5/1998 | Johnston et al. | 715/769 |
| 5,913,065 | A | * | 6/1999 | Faustini | 717/107 |
| 6,002,402 | A | * | 12/1999 | Schacher | 715/810 |
| 6,011,553 | A | * | 1/2000 | Komiyama | 715/839 |
| 6,133,898 | A | * | 10/2000 | Ludolph et al. | 715/790 |
| 6,583,799 | B1 | * | 6/2003 | Manolis et al. | 715/838 |
| 2002/0140746 | A1 | * | 10/2002 | Gargi | 345/853 |
| 2003/0056180 | A1 | * | 3/2003 | Mori | 715/530 |
| 2003/0066032 | A1 | * | 4/2003 | Ramachandran et al. | 715/513 |

FOREIGN PATENT DOCUMENTS

| | | |
|---|---|---|
| JP | 4-247572 | 9/1992 |
| JP | 5-225185 | 9/1993 |
| JP | 6-110675 | 4/1994 |
| JP | 7-200620 | 8/1995 |
| JP | 9-114633 | 5/1997 |
| JP | 9-293144 | 11/1997 |
| JP | 2000-132561 | 5/2000 |
| JP | 2000-172859 | 6/2000 |
| JP | 2001-34612 | 2/2001 |

* cited by examiner

*Primary Examiner*—Boris Pesin
(74) *Attorney, Agent, or Firm*—Oblon, Spivak, McClelland, Maier & Neustadt, L.L.P.

(57) ABSTRACT

An information processing apparatus is provided including a first display control unit for controlling display of an area to which to paste an image representing a content and selected to start reproduction of the content. A second display control unit displays a list of images when a display instruction to display the list of the images is given. Under control of the first display control unit, one screen including a different number of layers according to a category of data created in the area to which to paste the image is displayed in the area.

19 Claims, 25 Drawing Sheets

F I G. 7
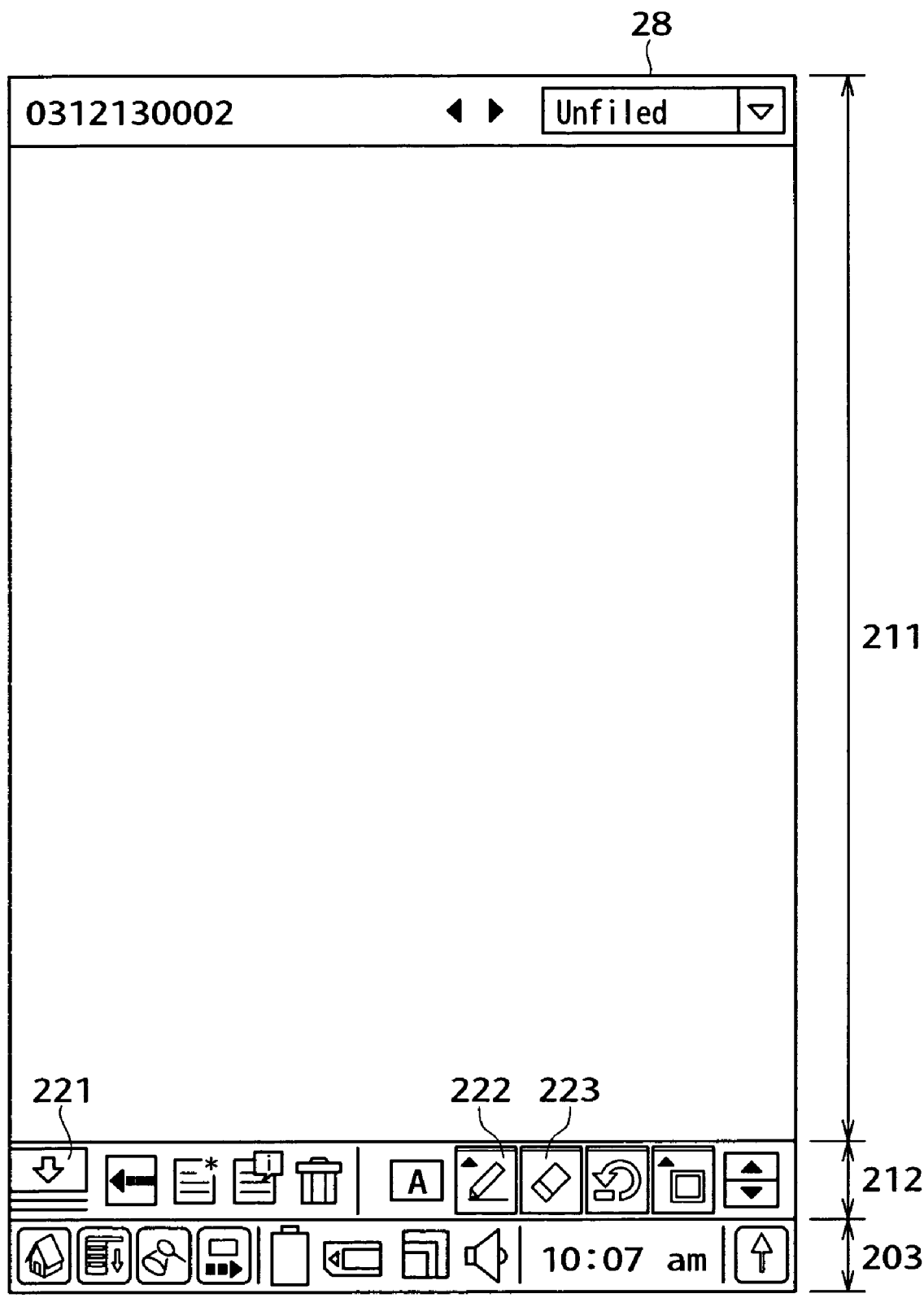

FIG. 12A
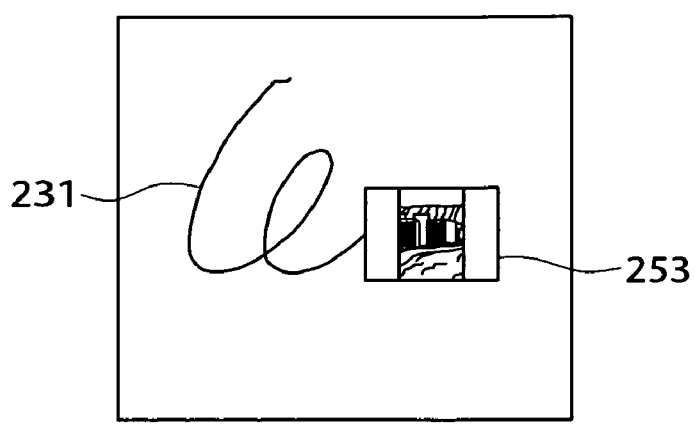
FIG. 12B
FIG. 12C
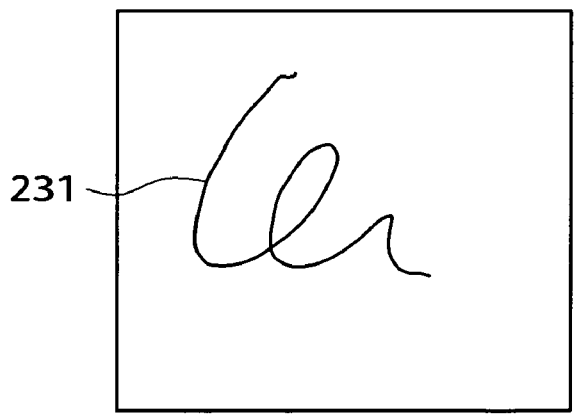
FIG. 12D
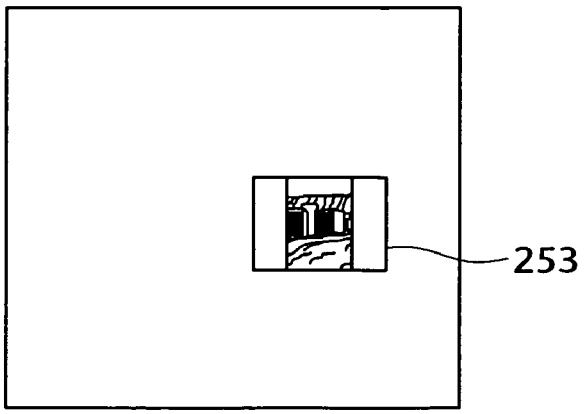

F I G. 21

| TYPE OF CONTENT | LINK INFORMATION | COORDINATES | WIDTH | HEIGHT | OTHERS |
|---|---|---|---|---|---|
| HANDWRITTEN CHARACTERS | LINK INFORMATION #1 | $(x_1, y_1)$ | $w_1$ | $h_1$ | COLOR, THICKNESS, ⋯ |
| MOVING PICTURE | LINK INFORMATION #2 | $(x_2, y_2)$ | $w_2$ | $h_2$ | THUMBNAIL, ⋯ |
| STILL PICTURE | LINK INFORMATION #3 | $(x_3, y_3)$ | $w_3$ | $h_3$ | THUMBNAIL, ⋯ |
| TEXT | LINK INFORMATION #4 | $(x_4, y_4)$ | $w_4$ | $h_4$ | FONT, COLOR, ⋯ |
| AUDIO | LINK INFORMATION #5 | $(x_5, y_5)$ | $w_5$ | $h_5$ | THUMBNAIL, ⋯ |
| ⋯ | ⋯ | ⋯ | ⋯ | ⋯ | ⋯ |

INFORMATION PROCESSING APPARATUS AND METHOD, AND PROGRAM

BACKGROUND OF THE INVENTION

The present invention relates to an apparatus and a method for information processing, and a program, and particularly to an apparatus and a method for information processing, and a program that make it possible to combine a plurality of contents in different categories into one piece of data and readily refer from the one piece of data to each of the contents combined in the one piece of data by intuitive operation.

Recently, with the spread of digital cameras and portable telephones having a picture taking function, creation of a material by pasting a picture taken by these devices to another content such as text data or the like using a personal computer has been generally performed. Thereby the creator can visually represent contents of the text data.

As another method of creating one content by associating a content with another content, one piece of text data in which a music content is associated with text data (a link to the music content is embedded in the text data) and reproduction of the music content can be directly started in a state of the text data being displayed on a screen is created.

As techniques for associating contents in various categories of still picture, moving picture, music and the like with each other and thereby facilitating handling these contents, there are techniques as disclosed in Japanese Patent Laid-Open No. 2001-209658.

However, to associate a content with another content, it is necessary to specify a folder storing the other content and select the content to be associated from the specified folder. This operation is complicated.

When pasting a still picture to text data being created, for example, it is necessary to display contents of a folder storing the still picture in another window than a window in which the text data is being created, and select the still picture to be pasted from the folder.

SUMMARY OF THE INVENTION

The present invention has been made in view of the above, and it is accordingly an object of the present invention to make it possible to combine a plurality of contents in different categories into one piece of data and readily refer from the one piece of data to each of the contents combined in the one piece of data by intuitive operation.

According to the present invention, there is provided an information processing apparatus including: first display control unit for controlling display of an area to which to paste an image representing a content and selected to start reproduction of the content; and second display control unit for displaying a list of images when a display instruction to display the list of the images is given; wherein under control of the first display control unit, one screen including a different number of layers according to a category of data created in the area to which to paste the image is displayed in the area.

The second display control unit can display the list of the images in an area that has formed a part of the area to which to paste the image until the display instruction is given.

The second display control unit can change a number of categories of contents images of which are displayed, according to one of the category of the data created in the area to which to paste the image and an instruction from a user.

According to the present invention, there is provided an information processing method including: a first display control step for displaying, in an area to which to paste an image representing a content and selected to start reproduction of the content, one screen including a different number of layers according to a category of data created in the area; and a second display control step for, when an instruction to display a list of images is given, displaying the list of the images.

According to the present invention, there is provided a program including: a first display control step for controlling display of an area to which to paste an image representing a content and selected to start reproduction of the content; and a second display control step for displaying a list of images when a display instruction to display the list of the images is given; wherein under control of processing of the first display control step, one screen including a different number of layers according to a category of data created in the area to which to paste the image is displayed in the area.

The apparatus and the method for information processing, and the program according to the present invention control display of an area to which to paste an image representing a content and selected to start reproduction of the content, and display a list of images when a display instruction to display the list of the images is given. At this time, one screen including a different number of layers according to a category of data created in the area to which to paste the image is displayed in the area.

According to the present invention, it is possible to display a list of images representing contents simultaneously with data to which to paste the images.

In addition, according to the present invention, it is possible to paste an image representing a content to the data to which to paste the images by intuitive operation.

Further, according to the present invention, it is possible to readily refer from the data to which an image representing a content is pasted to the content.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 7 is a diagram showing an example of a memo creating screen;

FIGS. 12A, 12B, 12C, and 12D are diagrams showing an example of layers including the screen of FIG. 10;

FIG. 21 is a diagram showing an example of database component information;

DETAILED DESCRIPTION OF THE PREFERRED EMBODIMENT

Figure 1:
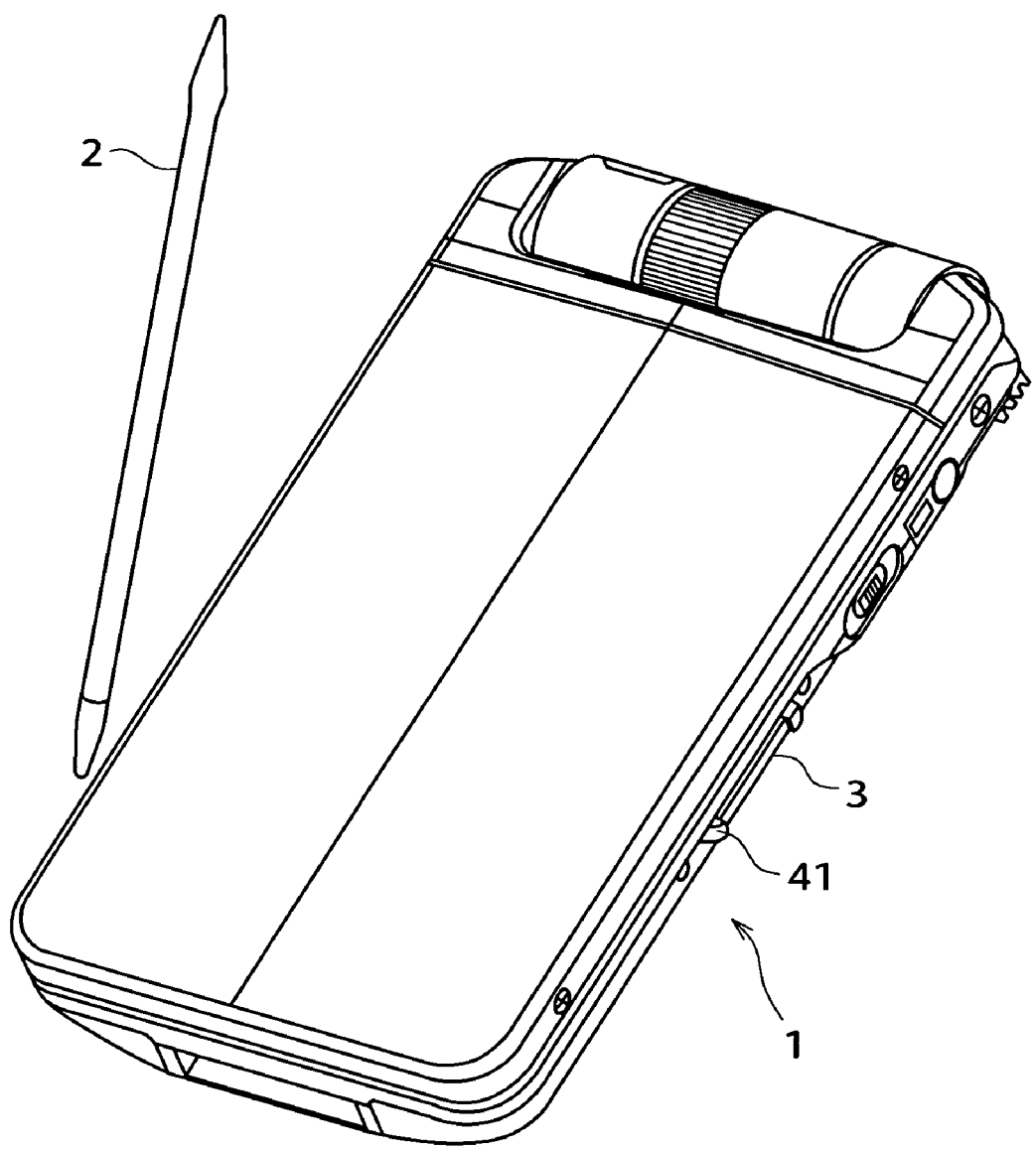
FIG. 1 is a perspective view of an example of an external appearance of a PDA in a state in which a display part is closed with respect to a main body part.

A preferred embodiment of the present invention will hereinafter be described. Correspondences between inventions described in the present specification and embodiments of the inventions are illustrated as follows. This description is to confirm that the embodiments supporting the inventions described in claims are described in the present specification. Therefore, even when there is an embodiment described in the embodiments of the inventions but not described here as corresponding to an invention, it does not signify that the embodiment does not correspond to the invention. Conversely, even when an embodiment is described here as corresponding to an invention, it does not signify that the embodiment does not correspond to inventions other than that invention.

Further, this description does not represent all the inventions described in the present specification. In other words, this description does not negate presence of inventions described in the present specification but not claimed in the present application, that is, presence of inventions for divisional application or to be added by amendments in the future.

An information processing apparatus according to an embodiment of the present invention (for example a PDA 1 in FIG. 1) includes: first display control unit (for example database display control unit 402 in FIG. 22) for controlling display of an area to which to paste an image (thumbnail image) representing a content (for example a still picture, a moving picture, voice, music, PIM information, or a memo database when the area to which to paste the image is a schedule) and selected to start reproduction of the content (reproduction of a still picture, a preview of a memo, a moving picture, or sound); and second display control unit (for example a thumbnail image display control unit 413 in FIG. 22) for displaying a list of images when a display instruction to display the list of the images is given; wherein under control of the first display control unit, one screen (for example a screen in FIG. 12A or FIG. 19A) including a different number of layers (for example layers of FIGS. 12B to 12D or FIGS. 19B to 19E) according to a category of data (for example a memo or a schedule) created in the area to which to paste the image is displayed in the area.

The second display control unit in the information processing apparatus according to an embodiment of the present invention displays the list of the images in an area (for example a thumbnail display area 241 in FIG. 9) that has formed a part of the area to which to paste the image until the display instruction is given.

The second display control unit in the information processing apparatus according to an embodiment of the present invention changes a number of categories of contents images of which are displayed, according to one of the category of the data created in the area to which to paste the image and an instruction from a user (for example displays a memo created in advance during creation of a schedule database, and does not display the memo created in advance during creation of a memo database).

An information processing method according to an embodiment of the present invention includes: a first display control step (for example step S2 in FIG. 23) for displaying, in an area to which to paste an image (thumbnail image) representing a content (for example a still picture, a moving picture, voice, music, PIM information, or a memo database when the area to which to paste the image is a schedule) and selected to start reproduction of the content, one screen (for example a screen in FIG. 12A or FIG. 19A) including a different number of layers (for example layers of FIGS. 12B to 12D or FIGS. 19B to 19E) according to a category of data (for example a memo or a schedule) created in the area; and a second display control step (for example step S23 in FIG. 24) for, when an instruction to display a list of images is given, displaying the list of the images in an area that has formed a part of the area to which to paste the image until the instruction is given.

An embodiment (but one example) corresponding to each step in a program according to an embodiment of the present invention is the same as in the information processing method according to an embodiment of the present invention.

A preferred embodiment of the present invention will hereinafter be described with reference to the drawings.

Figure 2:
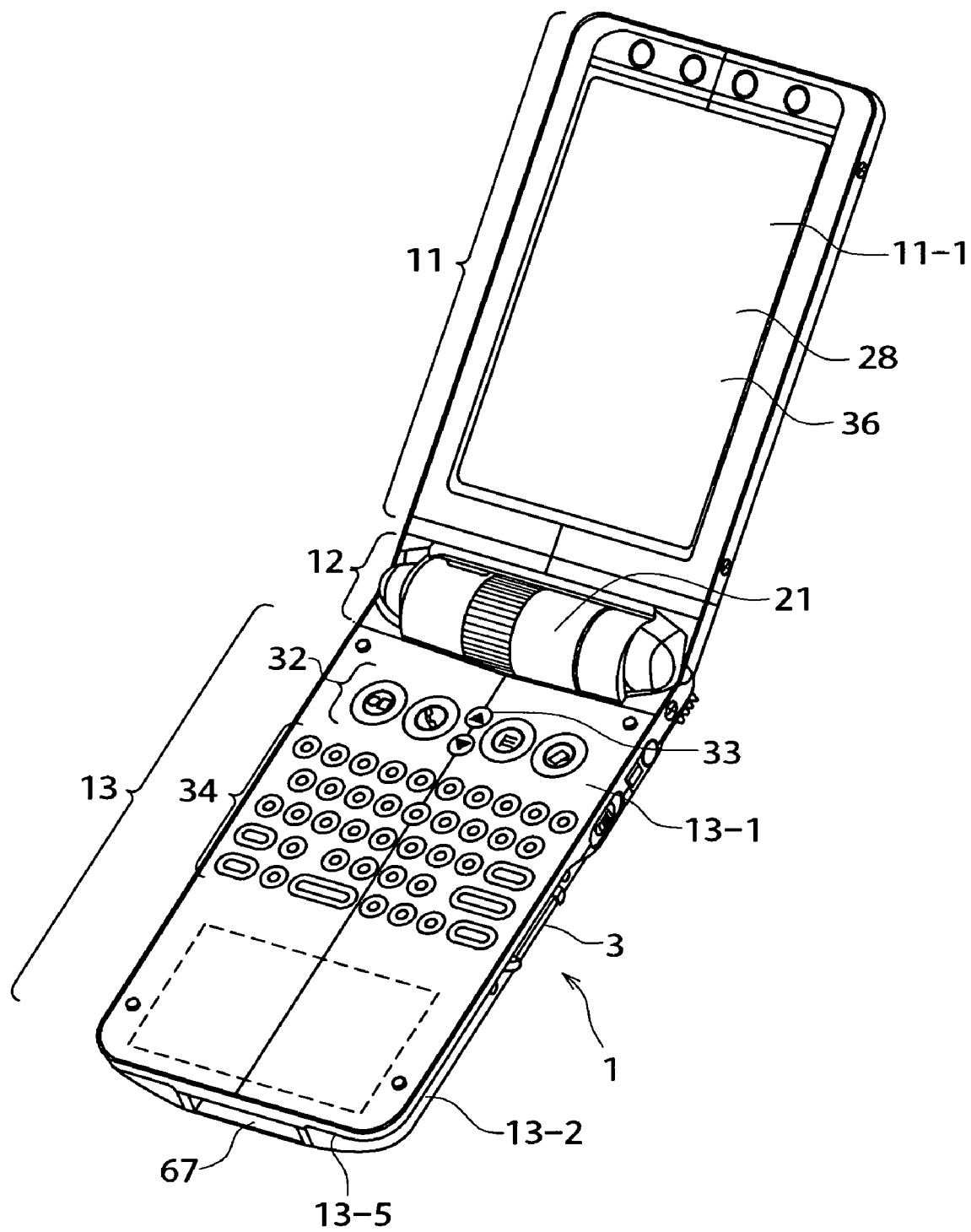
FIG. 2 is a perspective view of an example of an external appearance of the PDA in a state in which the display part is opened with respect to the main body part.
Figure 3:
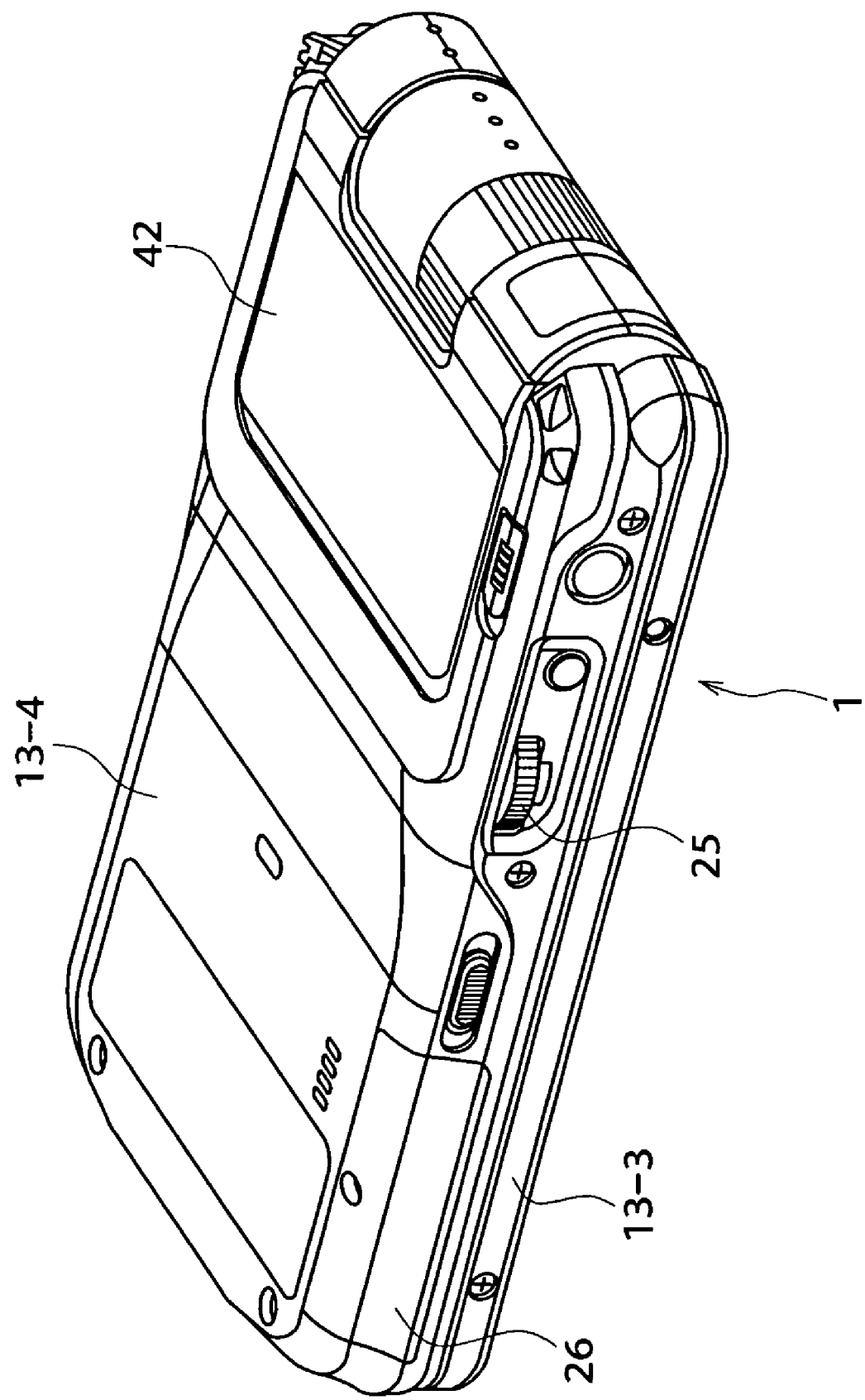
FIG. 3 is a perspective view showing an example of an external appearance of a back side of the PDA.
Figure 4:
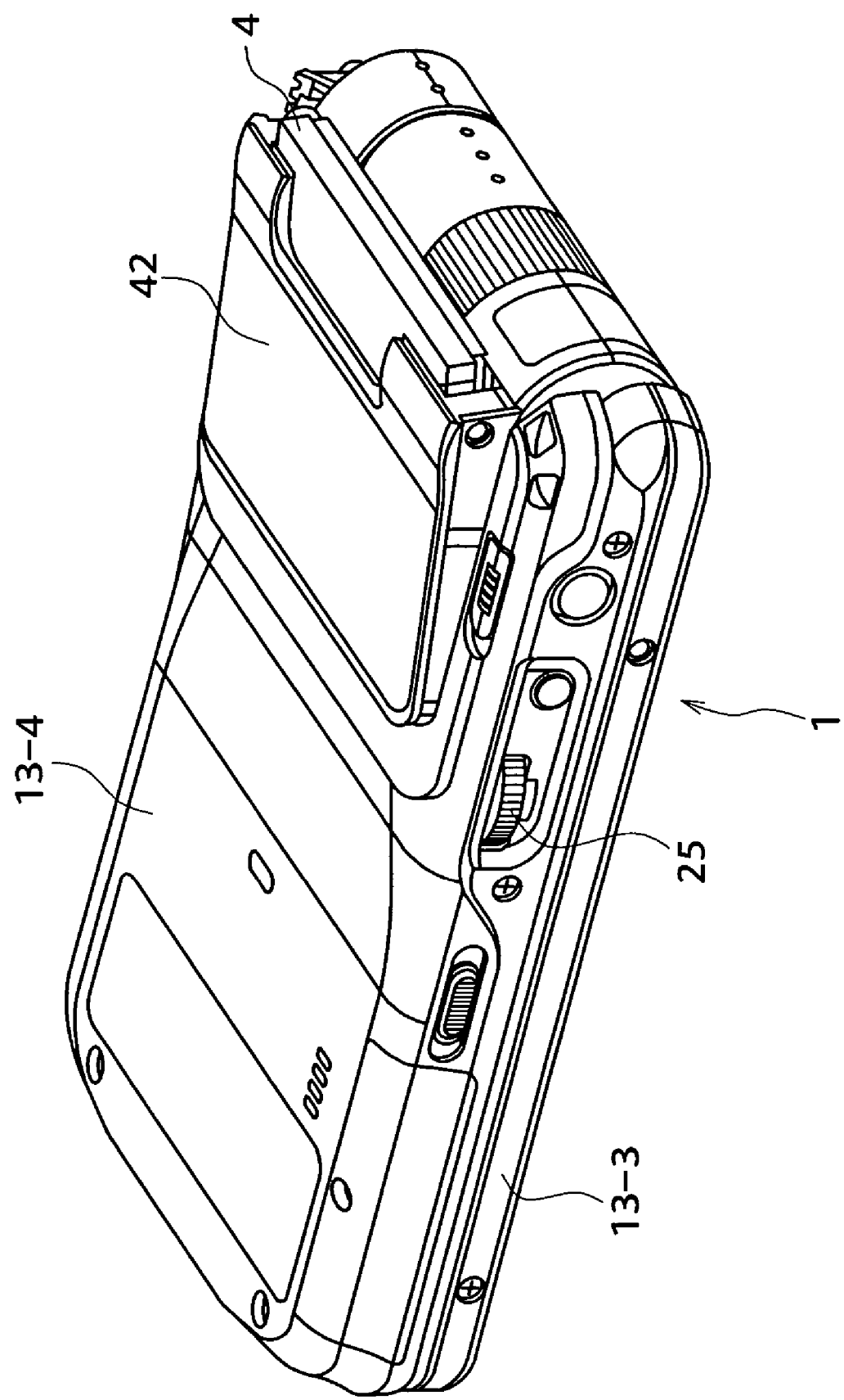
FIG. 4 is a perspective view showing an example of another external appearance of the back side of the PDA.

FIGS. 1 to 4 show external appearances of a PDA (Personal Digital Assistant) 1 to which the present invention is applied. FIG. 1 and FIG. 2 are perspective views showing external appearances of a front side of a body of the PDA 1. FIG. 3 and FIG. 4 are perspective views showing external appearances of a back side of the body of the PDA 1.

The PDA 1 is divided into a display part 11 and a main body part 13 by a central hinge part 12 shown in FIG. 2, and is foldable via the hinge part 12 (a folded state is shown in FIG. 1).

As shown in FIG. 2, an LCD (Liquid Crystal Display) 28 and a transparent touch panel 36 laminated on the LCD 28 are disposed on substantially an entire area of a surface 11-1 of the display part 11. When a user contacts a tip of a finger or a tip of a stylus 2 in FIG. 1 with an arbitrary position on the LCD 28, coordinates of the position are detected by the touch panel 36, and a predetermined process corresponding to the detected coordinates is performed.

The hinge part 12 has a camera unit 21 including a CCD (Charge Coupled Device) or the like.

Buttons 32 on which symbols representing respective application programs such as a schedule managing program and a telephone directory managing program, for example, installed on the PDA 1 are printed are disposed on an upper surface 13-1 of the main body part 13 which surface is opposed to the surface 11-1 (display part 11) when the PDA 1 is folded. When the user presses a button 32, an application program corresponding to the button 32 is started.

A scroll button 33 for scrolling a screen displayed on the LCD 28 in an upward direction or a downward direction is disposed at a central part of an area where the buttons 32 are disposed on the upper surface 13-1. Further, a keyboard 34 for inputting characters, symbols, numbers and the like is disposed below the buttons 32 and the scroll button 33 on the upper surface 13-1.

An MS slot 41 in which a Memory Stick™ (hereinafter described as an MS) 3 as one type of nonvolatile semiconductor memory is mountable is disposed in a right side surface 13-2 of the main body part 13 (FIG. 1). Incidentally, it is possible to mount a function extending module having the same shape as the MS 3, such as a communication function extending module using BLUETOOTH®, for example, in the MS slot 41.

As shown in FIG. 3, a left side surface 13-3 of the main body part 13 has a battery lid 26 that is opened and closed when a removable main battery 162 (FIG. 5) including a lithium-ion battery or the like for supplying power to the main body part 13 is inserted and removed. Also, a jog dial 25 that can be pressed and rotated is disposed on the left side surface 13-3 in a state of being slightly projected from the side surface.

A CF slot 42 in which a Compact Flash (registered trademark) (hereinafter described as a CF) 4 as one type of nonvolatile semiconductor memory is mountable is disposed in a back surface 13-4 of the main body part 13. As shown in FIG. 4, the CF slot 42 pops up when the CF 4 is inserted. Incidentally, it is possible to mount a function extending module having the same shape as the CF 4, such as a communication function extending module using the PHS (Personal Handyphone System), for example, in the CF slot 42.

A lower end surface 13-5 (FIG. 2) of the main body part 13 has a connector 67 for connecting an accessory device such as a cradle 91 (FIG. 5) for charging the removable main battery 162.

Figure 5:
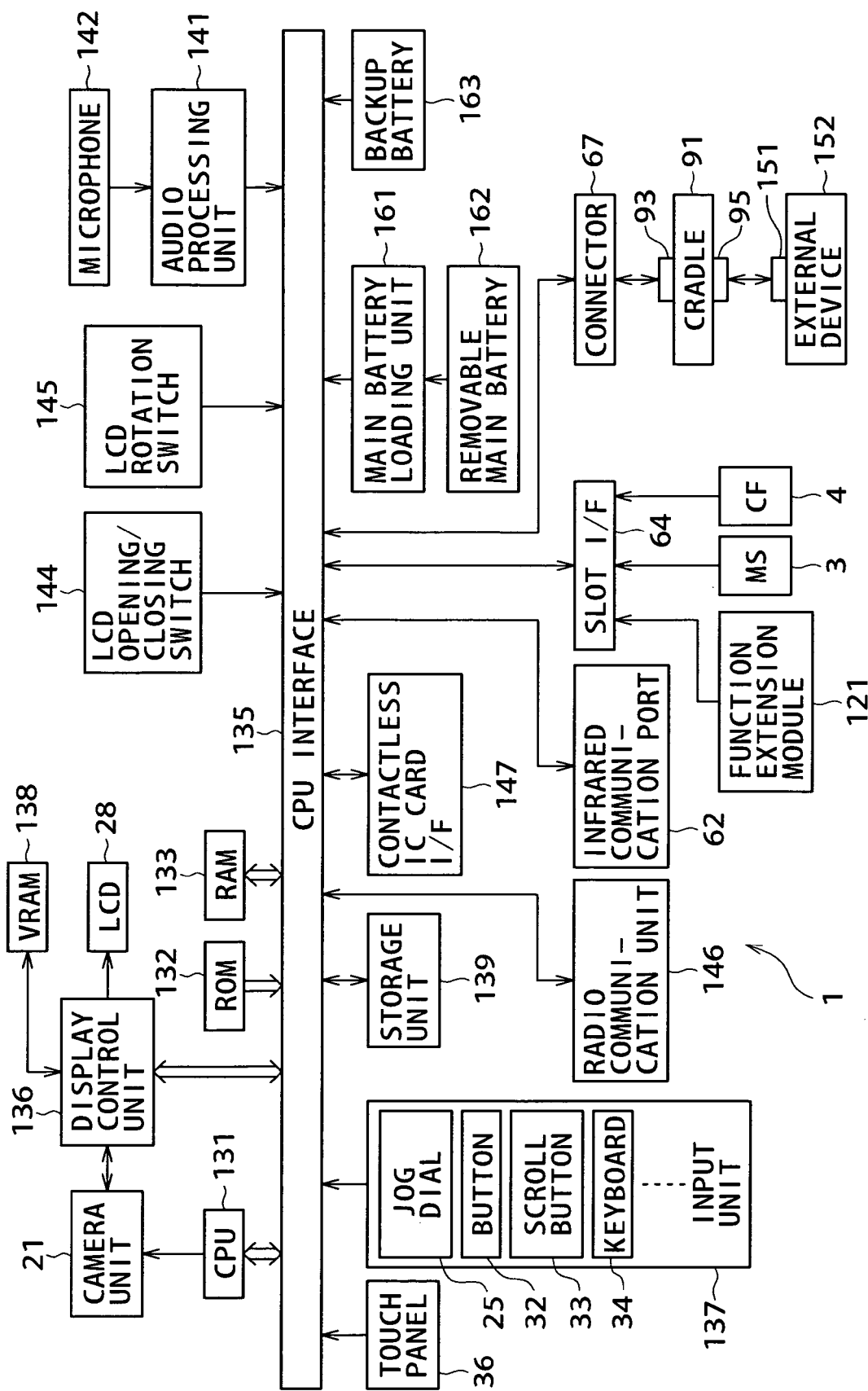
FIG. 5 is a block diagram showing an example of internal configuration of the PDA.

FIG. 5 is a block diagram showing an example of internal configuration of the PDA 1 having the external structure as described above.

A CPU (Central Processing Unit) 131 performs various processing according to a program stored in a ROM (Read Only Memory) 132 or an application program loaded from a storage unit 139 into a RAM (Random Access Memory) 133. The RAM 133 also stores data and the like necessary for the CPU 131 to perform various processing, as required.

The CPU 131, the ROM 132, and the RAM 133 are connected to each other via a CPU interface 135. The CPU interface 135 is also connected with a display control unit 136 for controlling display of a screen on the LCD 28.

The display control unit 136 is connected with a camera unit 21 and the LCD 28 as well as a VRAM 138. Under control of the CPU 131, the display control unit 136 stores an image picked up by the camera unit 21 in the VRAM 138, and displays the image stored in the VRAM 138 and images stored in other memories (the MS 3, the CF 4, the RAM 133, and the storage unit 139) on the LCD 28. The VRAM 138 stores not only the image picked up by the camera unit 21 but also an image to be displayed on the LCD 28.

The CPU interface 135 is also connected with an input unit 137 including the jog dial 25, the buttons 32, the scroll button 33, the keyboard 34 and the like, the touch panel 36, an infrared communication port 62, a slot I/F 64 corresponding to the MS slot 41 and the CF slot 42, the connector 67 connected with the cradle 91 or the like for charging the removable main battery 162 and a backup battery 163, and serving as a relay device for communication with another external device 152, and an audio processing unit 141 for converting sound collected by a microphone 142 into digital data.

Incidentally, information indicating the coordinates detected by the touch panel 36 is supplied to the CPU 131 via the CPU interface 135.

Further, the CPU interface 135 is connected with the storage unit 139 including an EEPROM (Electrically Erasable and Programmable Read Only Memory), a hard disk or the like. Unlike the MS 3 and the CF 4, which are a storage medium removable from the PDA 1, the storage unit 139 is a built-in memory of the PDA 1.

The CPU interface 135 is connected with a radio communication unit 146 for performing radio communication complying with a standard such as BLUETOOTH® or the like, and a contactless IC card interface (I/F) 147 for reading and writing data on an IC card such as a FeliCa™ in a non-contact manner.

An application program read from a magnetic disk, an optical disk, a magneto-optical disk, a semiconductor memory or the like loaded into the external device 152 as required is supplied to the PDA 1 and installed in the storage unit 139 as required by infrared communication performed via the infrared port 62, radio communication performed via the radio communication unit 146, or wire communication performed via the cradle 91, for example. An application program read from the MS 3 or the CF 4 loaded into the slot I/F 64 as required is also installed in the storage unit 139 as required.

The CPU interface 135 is provided with an LCD opening/closing switch 144 that is in an on state when the display part 11 is closed with respect to the main body part 13 and is in an off state when the display part 11 is opened with respect to the main body part 13, and an LCD rotation switch 145 that is brought into an on state when the display part 11 is rotated by a predetermined angle or more.

Further, the CPU interface 135 is connected with a main battery loading unit 161 in which the removable main battery 162 is loaded, and a backup battery 163 including a rechargeable button battery or the like serving as an auxiliary power supply when the removable main battery 162 is detached.

Figure 6:
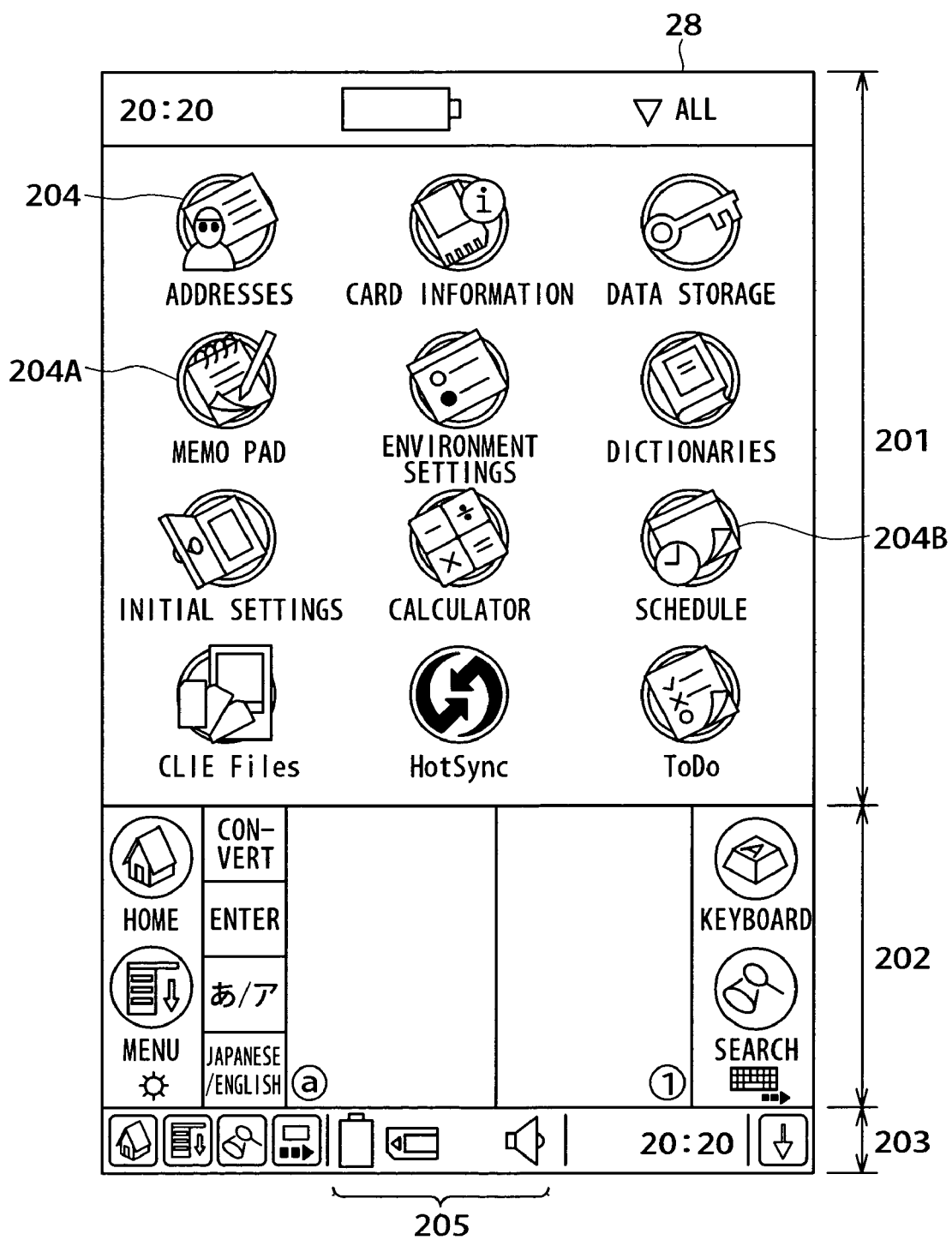
FIG. 6 is a diagram showing an example of a main screen.

FIG. 6 is a diagram showing an example of a main screen displayed on the LCD 28.

Various operations performed using the PDA 1 are basically started from this main screen. The main screen includes a standard display area 201, a silk area 202, and a status area 203.

When an application program (software) is being executed, the standard display area 201 displays a screen of the application program being executed. When no application program is executed, the standard display area 201 displays application icons 204 corresponding to respective installed application programs as shown in FIG. 6 (to be exact, however, in this case, it is not that no application program is executed, and an application program for displaying the application icons 204 for selection by the user is being executed).

A memo pad icon 204A tapped (the surface of the LCD 28 is pressed by the tip of the stylus 2) when an application for creating a memo is executed, and a schedule icon 204B tapped when an application for managing a schedule is executed are displayed as application icons 204 in FIG. 6.

The silk area 202 displays a user interface (an area for input by the user) corresponding to a silk plug-in being executed. Incidentally, depending on an application being executed, the display of the silk area 202 may disappear, and one screen may be displayed in the whole of the standard display area 201 and the silk area 202.

The status area 203 displays status icons 205 indicating states of the PDA 1 such as a battery capacity, whether the MS 3 is loaded in the MS slot 41 or not, whether the CF 4 is loaded in the CF slot 42 or not, and a sound volume setting, for example, a time and the like.

FIG. 7 is a diagram showing an example of a screen displayed when the memo pad icon 204A in FIG. 6 is tapped.

A memo creating screen shown in FIG. 7 is displayed by software for managing creation of a memo (database processing software to be described later) which software is started when the memo pad icon 204A is tapped.

The memo creating screen includes the status area 203 as well as a memo creating area 211 and a tool button area 212 for displaying various buttons operated in selecting a tool for creating a memo.

The user can input an arbitrary character or symbol or the like by contacting the tip of the stylus 2 with the memo creating area 211 and moving the stylus 2 while the tip of the stylus 2 is contacted with the memo creating area 211. An image 231 of a curve in FIG. 8, for example, represents a trail along which the tip of the stylus 2 moved. Thus, the user can make a memo in the memo creating area 211 using the stylus 2.

As will be described later in detail, the user can also create a memo by not only inputting characters and symbols by the stylus 2 but also pasting images representing various contents such as still pictures and moving pictures taken by the camera unit 21, recorded sound or the like (the contents can be associated with the memo).

The tool button area 212 in FIG. 7 is provided with a list display button 221 operated (tapped) to display a list of contents to be pasted to the memo and close a list of contents already displayed, and a pen button 222 operated in inputting handwritten characters and the like in the memo creating area 211. A pen mode is set when the user operates the pen button 222. It is possible to input handwriting as shown in FIG. 8 to the memo creating area 211 while the pen mode is set.

The tool button area 212 also displays an eraser button 223 operated to erase characters and the like once inputted in the memo creating area 211, as well as buttons operated to select various tools.

Figure 8:
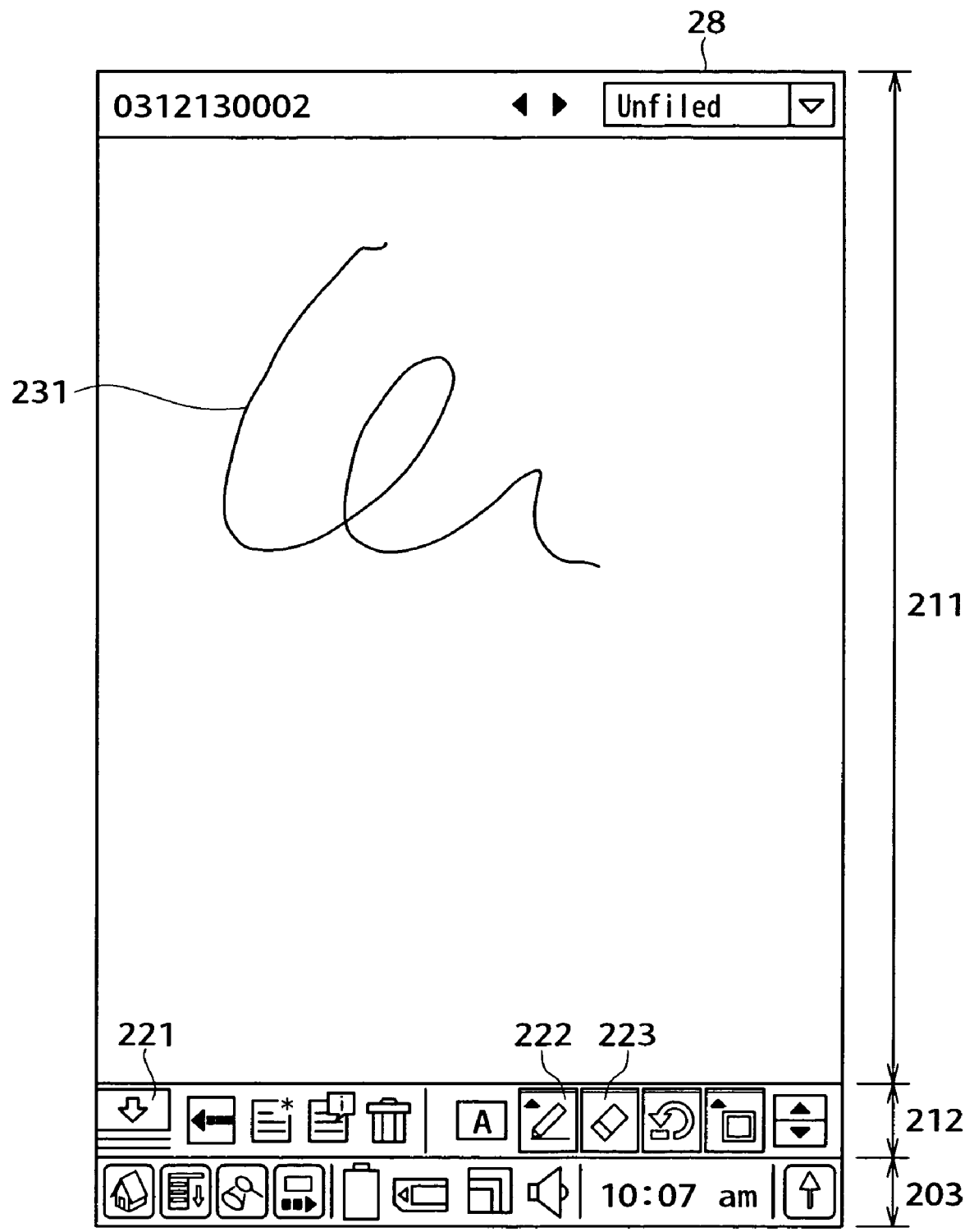
FIG. 8 is a diagram showing another example of the memo creating screen.
Figure 9:
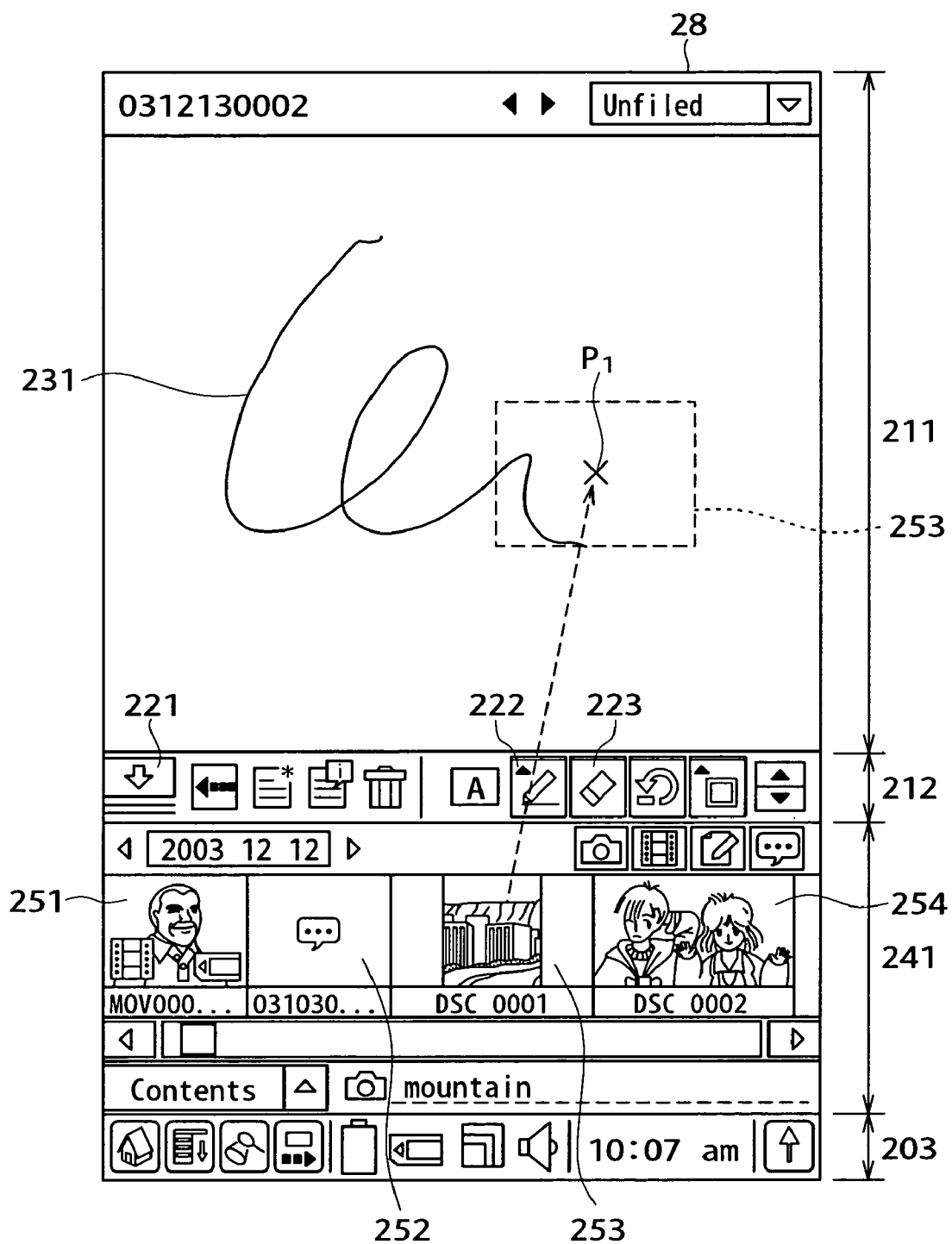
FIG. 9 is a diagram showing a further example of the memo creating screen.

FIG. 9 is a diagram showing an example of a screen displayed when the list display button 221 is tapped in a state of FIG. 8 (a state in which a list of contents is not displayed).

When the list display button 221 is tapped, a thumbnail display area 241, which is an area including an area that has formed a part of the memo creating area 211, is formed between the tool button area 212 and the status area 203 as shown in FIG. 9. A list of contents (thumbnail images representing the contents) that can be pasted to the memo being created using the memo creating area 211 is displayed in the thumbnail display area 241.

The thumbnail images displayed in the thumbnail display area 241 are generated from data of the contents proper. For example, a thumbnail image of a still picture content is generated by reducing a still picture of the content proper. A thumbnail image of a moving picture is generated by reducing an image of for example a first frame (a first I (Intra) picture in the case of a moving picture content compressed by an MPEG (Moving Picture Experts Group) system) selected from among consecutive images. Incidentally, an image of a balloon is used as a thumbnail image of an audio content.

Displayed in the example of FIG. 9 are, from the left, a thumbnail image 251 representing a moving picture content having a file name of "MOV000..." set thereto, a thumbnail image 252 representing an audio content having a file name of "031030..." set thereto, a thumbnail image 253 representing a still picture (landscape) content having a file name of "DSC0001" set thereto, and a thumbnail image 254 representing a still picture (portrait) content having a file name of "DSC0002" set thereto.

The data of the contents proper represented by these thumbnail images is stored in the storage unit 139 as an internal memory of the PDA 1, the MS 3 loaded in the PDA 1, and the like.

As shown by a dotted line arrow in FIG. 9, for example, the user can paste the thumbnail image 253 to a position P1 by pressing the stylus 2 against the thumbnail image 253 of the still picture content as the third content from the left, moving the stylus 2 to the position P1 in the memo creating area 211 while maintaining the pressed state of the stylus 2, and detaching the tip of the stylus 2 from the surface of the LCD 28 (by a drag and drop).

Figure 10:
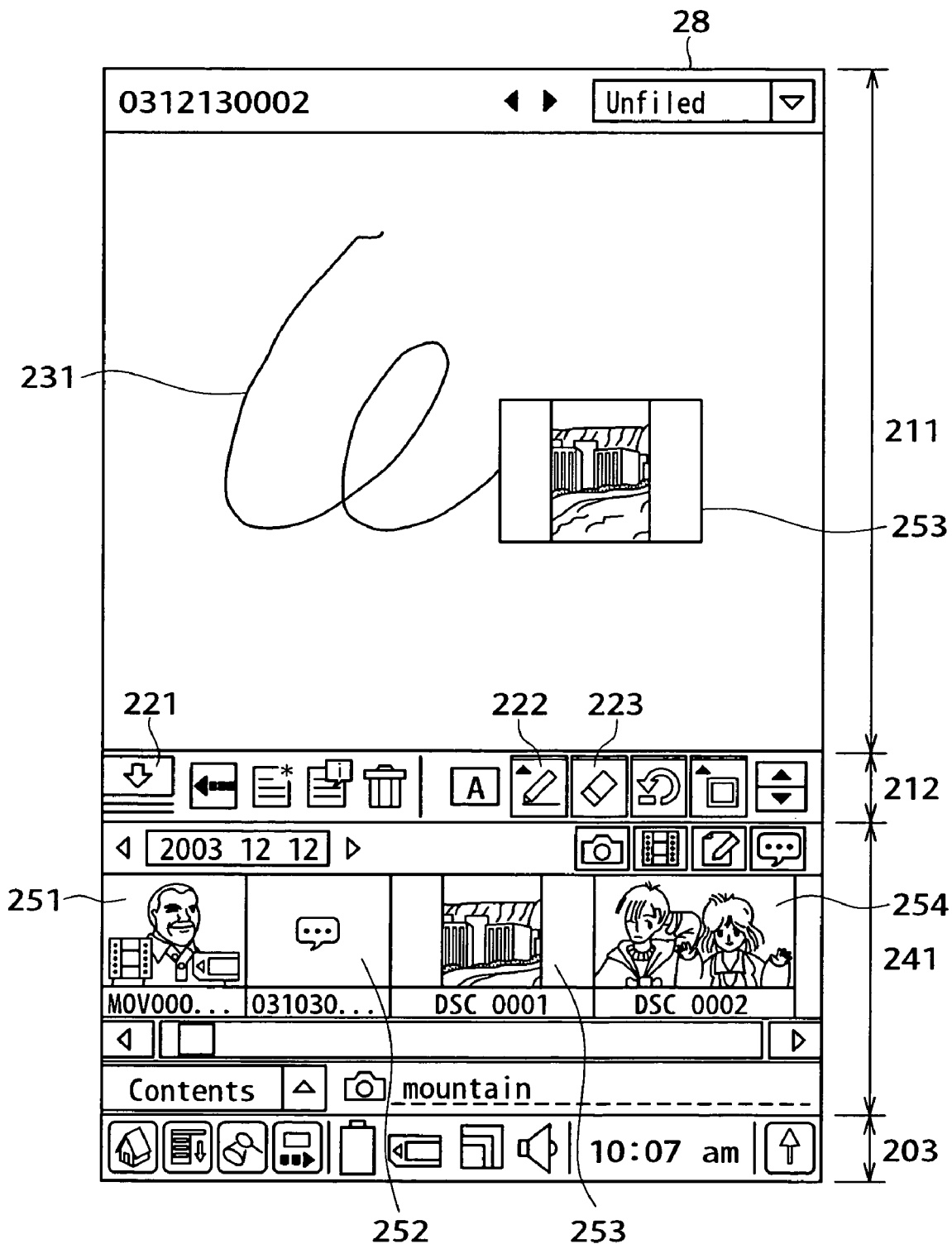
FIG. 10 is a diagram showing an example of the memo creating screen.

FIG. 10 is a diagram showing an example of a screen on which the thumbnail image 253 is pasted at the position P1. Thus, the user can paste thumbnail images of contents in various categories such as still pictures and the like to the memo being created by dragging and dropping the contents from the displayed list. Incidentally, the user can further move the thumbnail image 253 pasted at the position P1 to another position in the memo creating area 211 when the pen mode is set.

For example, by inputting handwritten characters such as "A photograph taken when we went..." in the memo creating area 211 and pasting a thumbnail image of the photograph (still picture content) to the memo, the user can easily classify photographs within the PDA 1. This operation is more intuitive than a classifying operation performed by creating a new folder and storing contents such as photographs or the like in the folder, and is desirable from a viewpoint of the nature of the PDA 1 readily operated in a short time while the user is out, for example.

In addition, by tapping the thumbnail image pasted to the memo, the user can start reproduction of the content represented by the thumbnail image.

Figure 11:
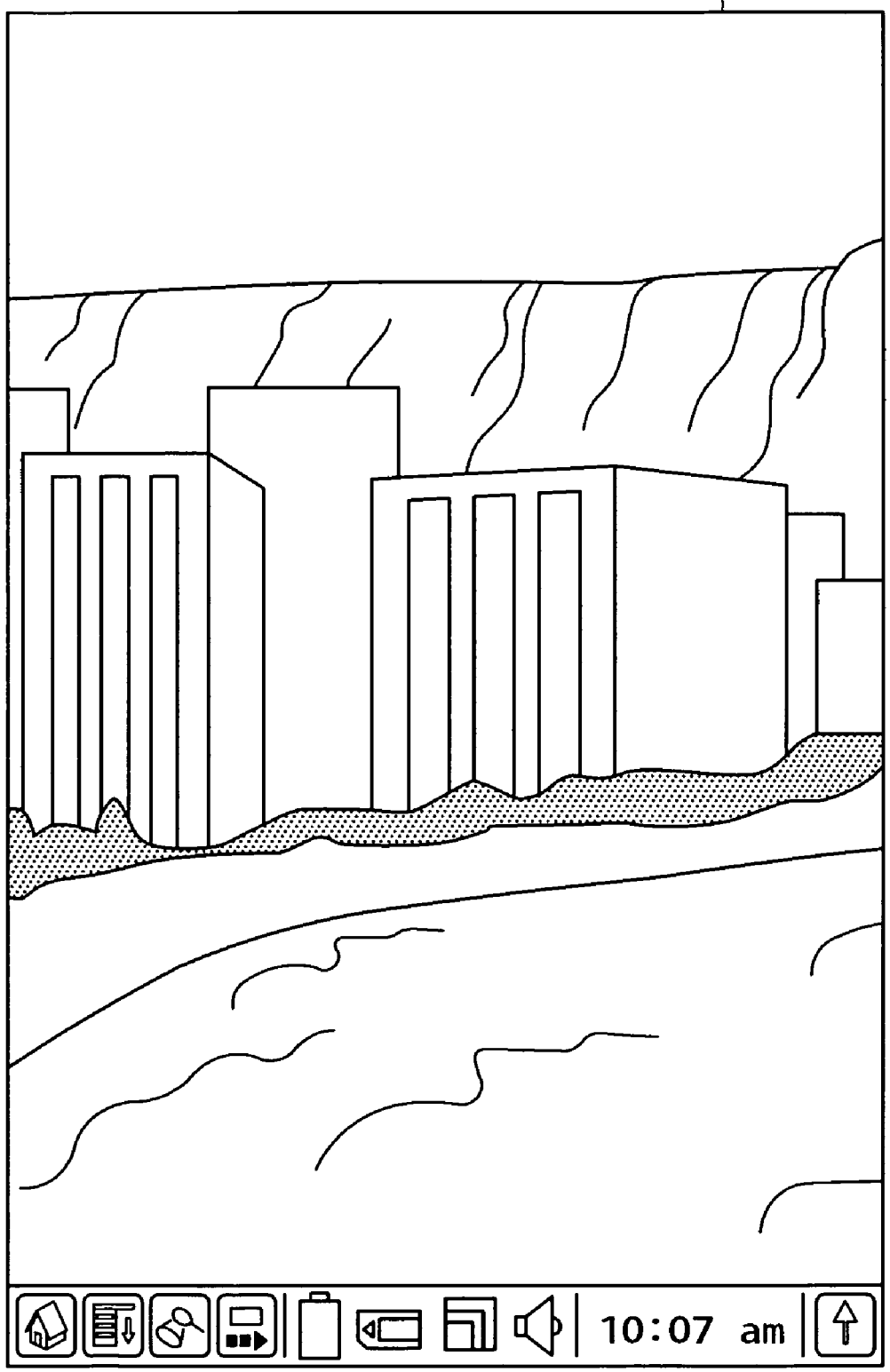
FIG. 11 is a diagram showing an example of a screen displaying a content.

FIG. 11 is a diagram showing an example of a screen when the still picture content represented by the thumbnail image 253 is reproduced (previewed) by tapping the thumbnail image 253 in FIG. 10.

When the thumbnail image 253 is tapped, software having a viewer function for still picture contents (content processing software to be described later) is started, and the picture is displayed using the entire area other than the status area 203 on the basis of data of the still picture content proper represented by the thumbnail image 253. Thereby, the user can easily check details of the still picture content.

Incidentally, when the thumbnail image 251 of the moving picture content pasted to the memo is tapped, the moving picture content is similarly reproduced, and the picture is displayed using the area other than the status area 203 as shown in FIG. 11. When the thumbnail image 252 of the audio content pasted to the memo is tapped, the audio content is reproduced.

FIGS. 12A to 12D are diagrams showing a layered structure of display of the memo thus created.

FIG. 12A is a diagram showing a screen displayed in the memo creating area 211 in FIG. 10 (a part excluding a number and characters ("Unfiled") displayed in an upper part).

The screen of FIG. 12A includes a plurality of layers. A plain layer as shown in FIG. 12B (a layer having no input therein like the memo creating area 211 in FIG. 7) is disposed in a lowermost layer of the plurality of layers.

A layer displaying the image 231 of the handwritten curve inputted by the stylus 2 is disposed on the plain layer of FIG. 12B. A layer displaying the thumbnail image 253 (an uppermost layer for forming the screen of FIG. 12A) is disposed on the layer displaying the image 231. When a plurality of thumbnail images are pasted to the memo, thumbnail image displaying layers equal in number to that of thumbnail images pasted are disposed on a virtual basis.

Thus, the screen displayed in the memo creating area 211 by the software for managing the creation of the memo includes the three layers of FIGS. 12B to 12D. The number of layers is different from a number of layers including a screen displayed in an area corresponding to the memo creating area 211 by software for managing creation of schedules to be described later.

Details of display of the thumbnail display area 241 will be described in the following.

Figure 13A:
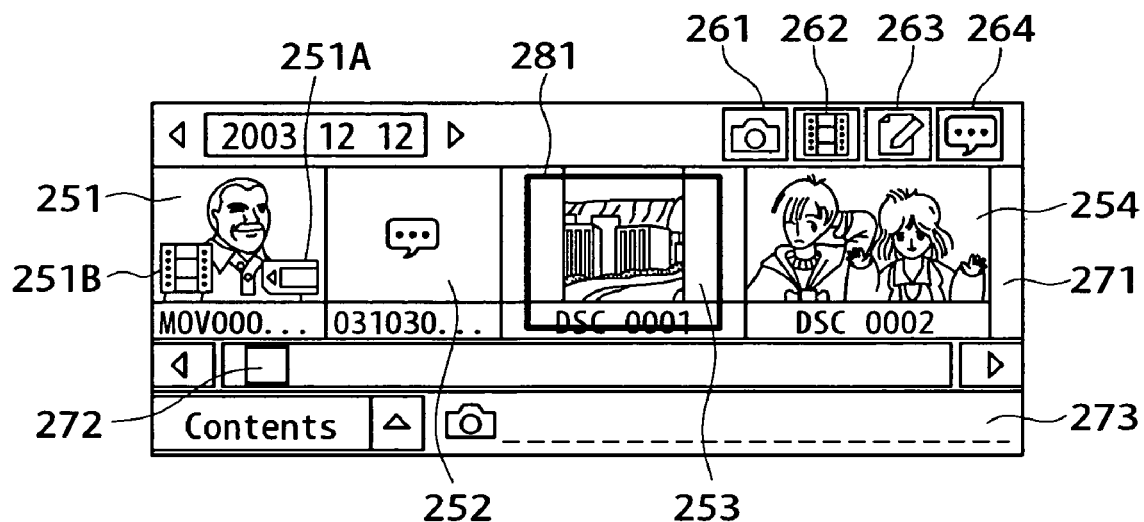
FIGS. 13A and 13B are diagrams showing details of a thumbnail display area in FIG. 9.

FIG. 13A is a diagram showing only the thumbnail display area 241 in FIG. 9.

Category selecting buttons 261 to 264 for filtering thumbnail images displayed in a thumbnail image display part 271 according to a content category represented by the category selecting buttons 261 to 264 are displayed in an upper right of the thumbnail display area 241.

Specifically, when the list display button 221 is operated, thumbnail images of contents of all categories that can be pasted to the memo being created in the memo creating area 211 are displayed in the thumbnail image display part 271. By operating the category selecting buttons 261 to 264, the user can limit thumbnail images displayed in the thumbnail image display part 271.

For example, when the category selecting button 261 having a picture of a camera attached thereto is operated, thumbnail images of still picture contents are excluded (display of the thumbnail images disappears) from the thumbnail images displayed in the thumbnail image display part 271. When the category selecting button 262 having a picture of a film attached thereto is operated, thumbnail images of moving picture contents are excluded.

When the category selecting button 263 having a picture of a pen and paper (memo) attached thereto is operated, thumbnail images of memo contents are excluded from the thumbnail images displayed in the thumbnail image display part 271.

Incidentally, in creating a memo (in executing the software for managing the creation of the memo) in the PDA 1, another memo created in advance cannot be pasted as a content to the memo being created. Hence, thumbnail images of memos are not displayed in the thumbnail image display part 271 while the memo is being created, and therefore the category selecting button 263 cannot be operated.

While the software for managing creation of a schedule to be described later is being executed, a memo created in advance can be pasted as a content to the schedule being created, and when the category selecting button 263 is operated, thumbnail images of memos are excluded from the thumbnail images displayed in the thumbnail image display part 271.

The category selecting button 264 having a picture of a balloon attached thereto is provided at a position adjacent to the category selecting button 263 on a right side. When the category selecting button 264 is operated, thumbnail images of audio contents are excluded from the thumbnail images displayed in the thumbnail image display part 271.

Figure 13B:
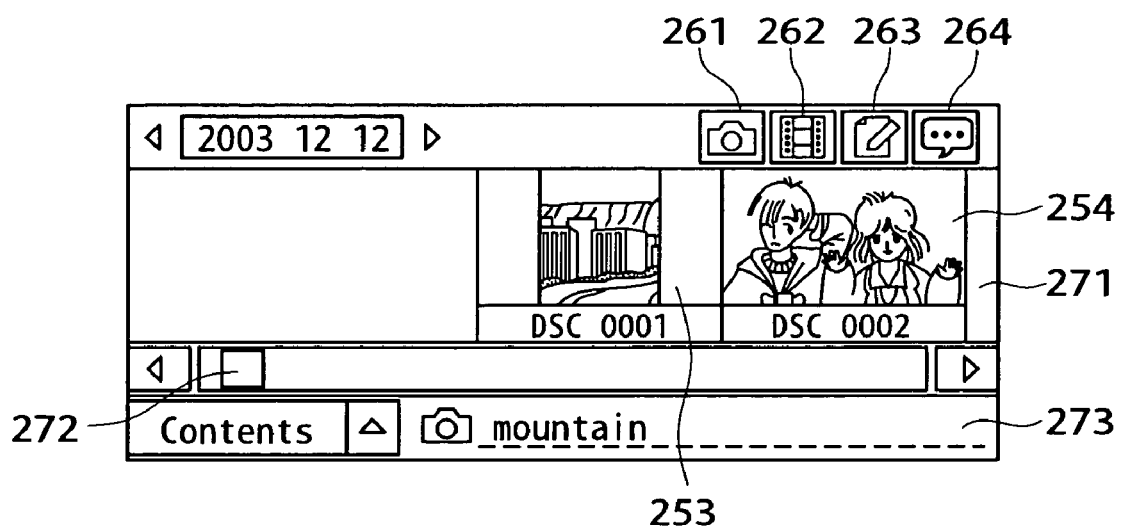

FIG. 13B is a diagram showing display of a state after the category selecting button 262 (the button for making display of moving picture contents disappear) and the category selecting button 264 (the button for making display of audio contents disappear) are operated, which state is changed from the state of FIG. 13A in which the thumbnail images of contents in the categories of still picture, moving picture, and audio are displayed.

As shown in FIG. 13B, of the thumbnail images displayed in the thumbnail image display part 271, thumbnail images representing moving picture and audio contents are removed by filtering, and display thereof disappears.

The thumbnail images displayed in the thumbnail image display part 271 can be thus filtered on the basis of categories. Therefore the user can quickly find a thumbnail image of a content to be pasted.

When a certain still picture content is to be pasted to a memo, for example, the user can quickly find a thumbnail image of the still picture content to be pasted by searching for the thumbnail image after removing thumbnail images of contents in the other categories as shown in FIG. 13B.

It is possible to start reproduction of a content from a thumbnail image displayed in the thumbnail image display part 271 as described above, as a content represented by a thumbnail image pasted to a memo can be reproduced from the thumbnail image.

For example, when the thumbnail image 253 of the still picture content is selected by a cursor 281 as shown in FIG. 13A and then tapped, the still picture content is displayed in an enlarged state on the LCD 28 as described with reference to FIG. 11. That is, software providing a viewer function is executed to display the still picture content.

Displayed under the thumbnail image display part 271 is a scroll bar 272 operated in a horizontal direction to change a range of thumbnail images displayed in the thumbnail image display part 271. Displayed under the scroll bar 272 is a content information display unit 273 for displaying a name and the like of a content selected by the cursor 281.

Incidentally, an image 251A showing an external appearance of the MS 3 which image is displayed on the thumbnail image 251 of the moving picture content in FIG. 13A indicates that the moving picture content is stored in the MS 3 as an external memory. An image 251B showing a picture of a film indicates that the thumbnail image 251 to which the image 251B is attached is a thumbnail image of a moving picture content (the thumbnail image can be distinguished from a thumbnail image of a still picture content).

Figure 14:
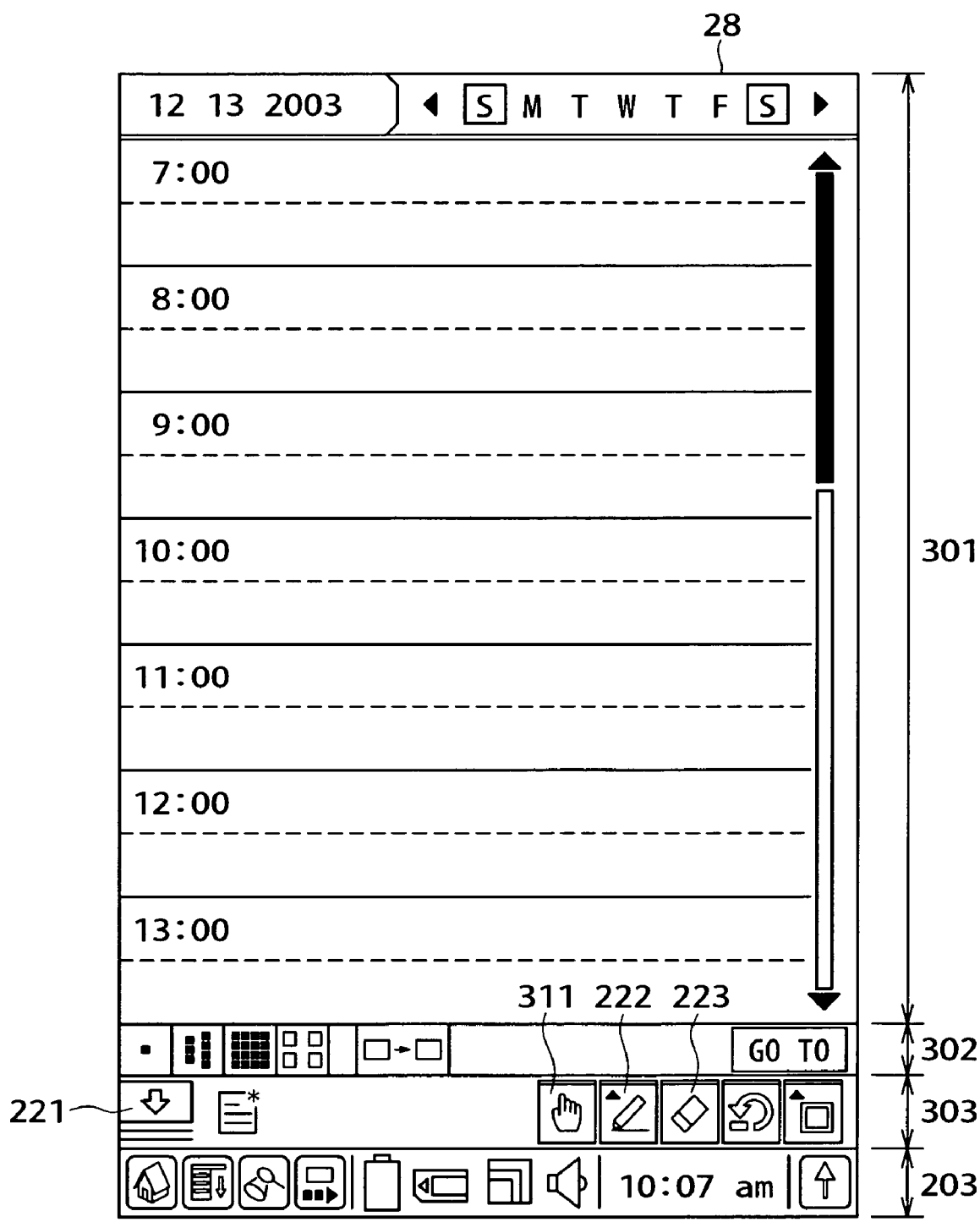
FIG. 14 is a diagram showing an example of a schedule creating screen.

FIG. 14 is a diagram showing an example of a screen displayed when the schedule icon 204B in FIG. 6 is tapped. In FIG. 14, the same parts as in FIG. 7 are identified by the same reference numerals.

When the schedule icon 204B is tapped, the software for managing creation of a schedule is started, and a schedule creating screen as shown in FIG. 14 is displayed.

The schedule creating screen includes: a status area 203; a schedule input area 301 in which times are displayed at predetermined intervals; a display changing area 302 in which buttons and the like operated to change a display form (a display form in a unit of a week or a unit of a month) of the schedule input area 301 are provided; and a tool button area 303 in which buttons operated to select a tool for creating a schedule are provided.

Provided in the tool button area 303 are the same buttons as are provided in the tool button area 212 in FIG. 7, such for example as a list display button 221 operated to display a list of thumbnail images of contents to be pasted to the schedule, a pen button 222 operated to input characters, symbols and the like handwritten in the schedule input area 301, and an eraser button 223 operated to erase the handwritten characters and the like once inputted.

In addition to these buttons, a hand button 311 operated to select a hand mode for selecting one item in the schedule input in the schedule input area 301 and moving the selected item or changing contents is displayed in the tool button area 303. The hand button 311 is not provided at the time of creation of the memo described above.

Figure 15:
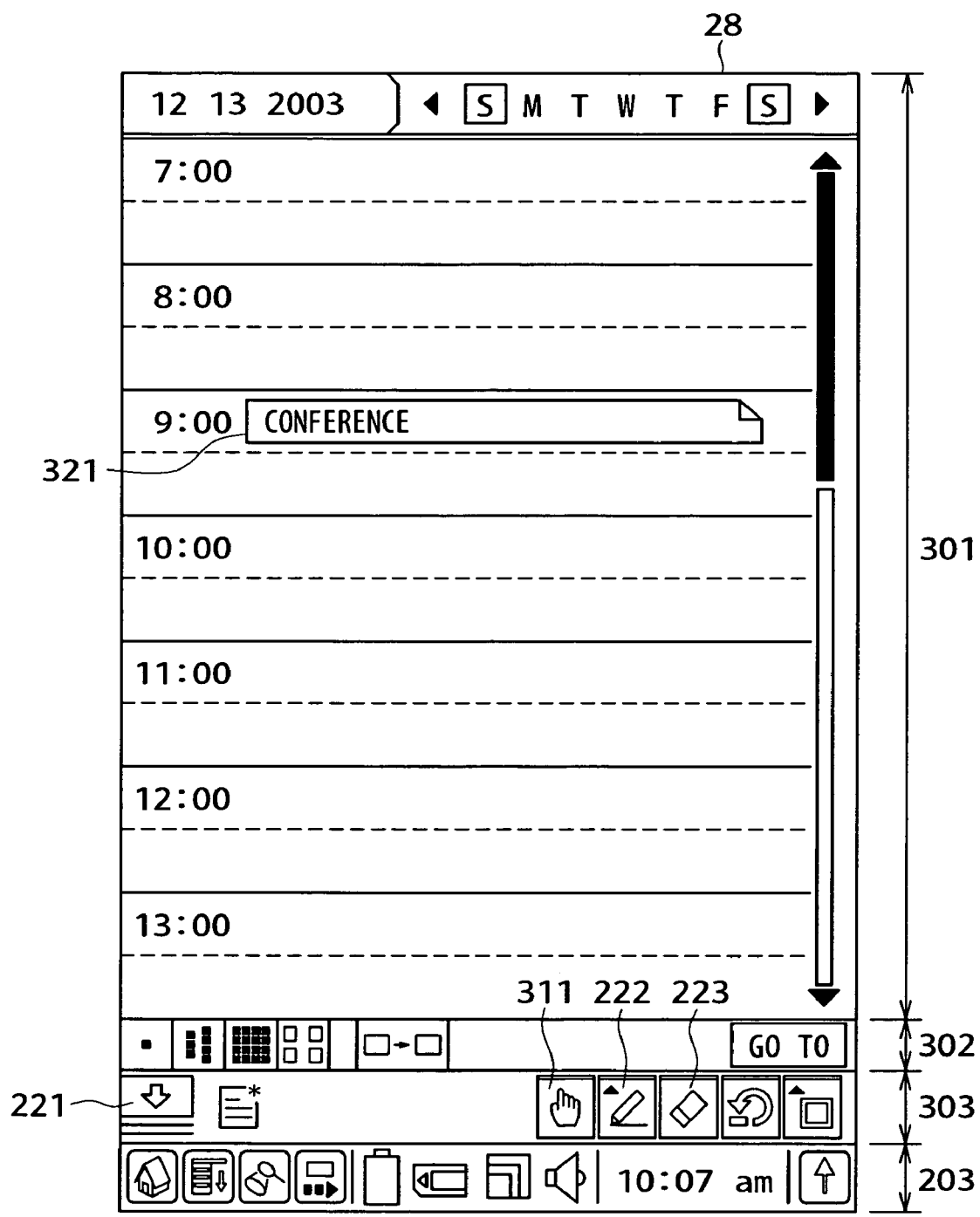
FIG. 15 is a diagram showing another example of the schedule creating screen.

FIG. 15 is a diagram showing an example of a screen in a state in which a plan is inputted on the screen of FIG. 14.

A plan 321 (a plan for which letters "conference" are inputted) in a section of nine o'clock (9:00) in the schedule input area 301 is inputted after the user operates the hand button 311 to set the hand mode, for example. When a time period of nine o'clock is selected by the stylus 2 as a time period in which to input the plan, the silk area 202 in FIG. 6 is displayed at a lower part of the screen, and thus the user inputs the plan using the area (inputs the letters "conference").

Incidentally, a button adjacent to the list display button 221 on a right side is operated to create a new plan. When this button is operated, a new plan can be input as when a time period is specified while the hand mode is set.

Figure 16:
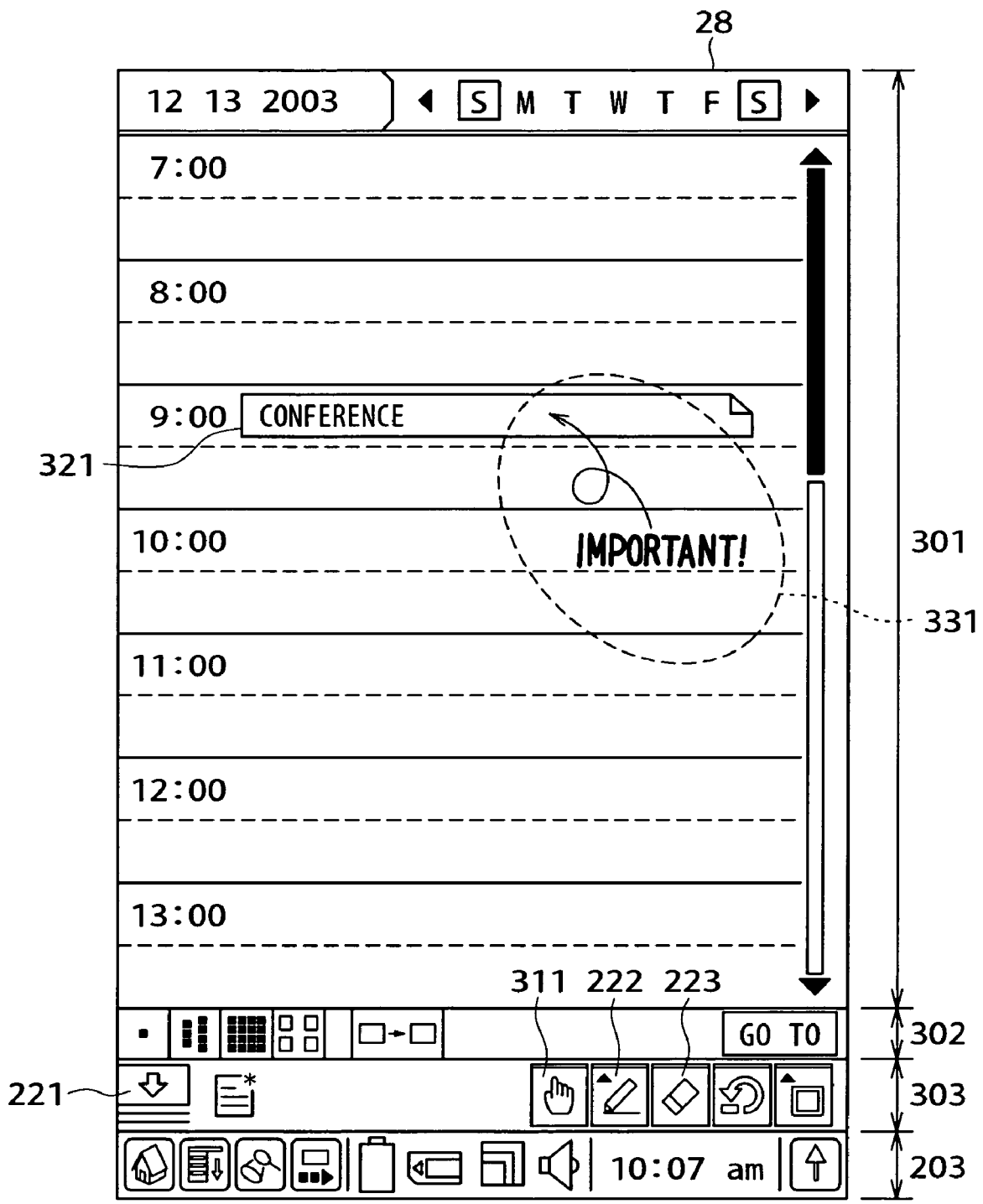
FIG. 16 is a diagram showing a further example of the schedule creating screen.

FIG. 16 is a diagram showing a screen in a state in which an image 331 including handwritten characters "IMPORTANT!" and an image of an arrow indicating the plan 321 is input on the screen in the state of FIG. 15.

By operating the pen button 222 to set the pen mode, the user can input handwritten characters and the like in the schedule input area 301.

Thus, also in creating a schedule, the user can input not only a plan item in a specified time period but also handwritten characters as in the case of creating the memo as described above.

Figure 17:
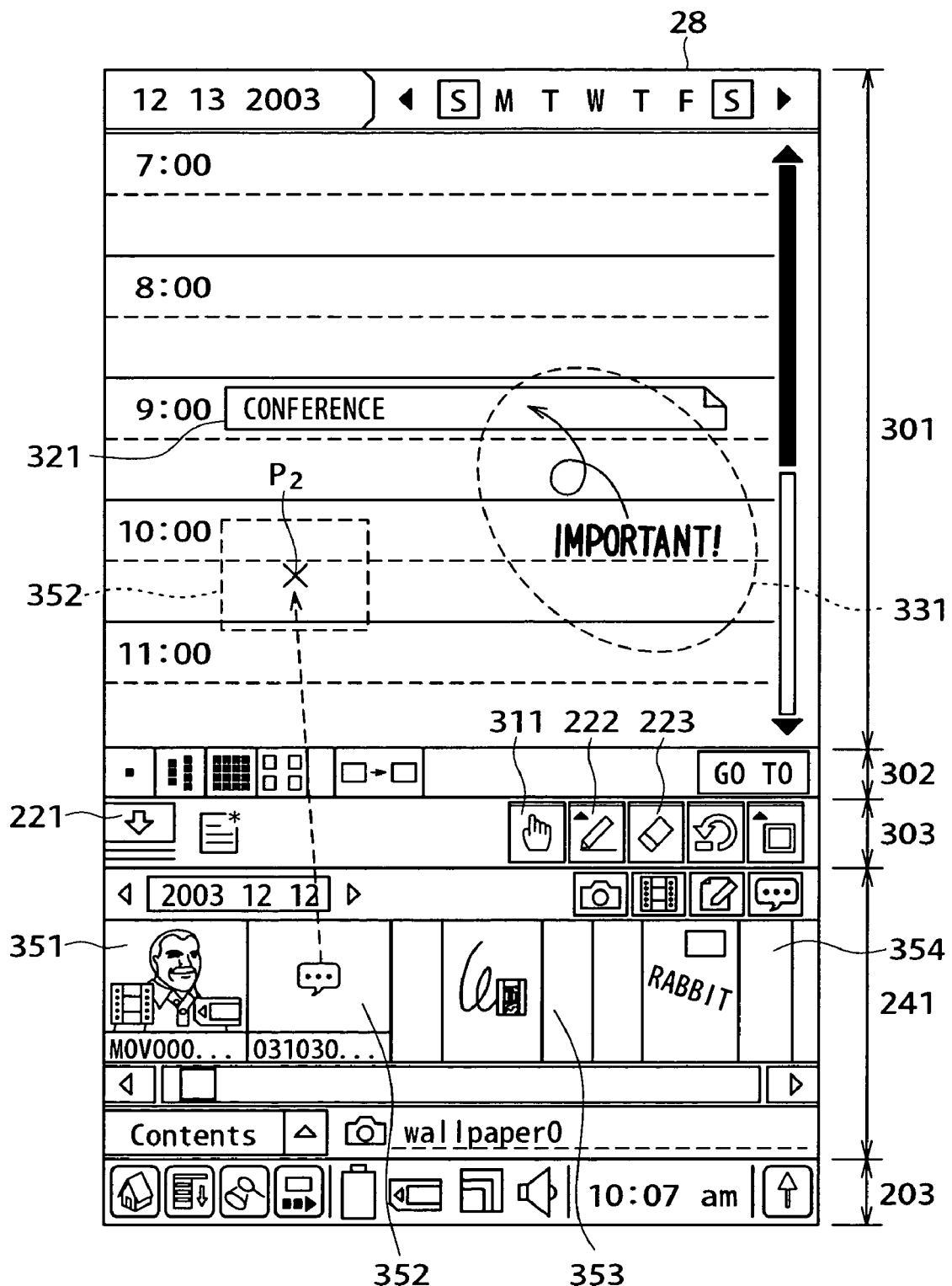
FIG. 17 is a diagram showing an example of the schedule creating screen.

FIG. 17 is a diagram showing an example of a screen displayed when the list display button 221 is tapped in the state of FIG. 16 (the state in which a list of thumbnail images is not displayed).

When the list display button 221 is tapped, a thumbnail display area 241, which is an area including an area that has formed a part of the schedule input area 301, is formed between the tool button area 303 and the status area 203 as shown in FIG. 17. A list of thumbnail images of contents that can be pasted to the schedule input area 301 is displayed in the thumbnail display area 241.

For example, the user can paste a thumbnail image 352 of an audio content to a position P2 by pressing the stylus 2 against the thumbnail image 352, moving the stylus 2 to the position P2 in the schedule input area 301 while maintaining the pressed state of the stylus 2 as shown by a dotted line arrow in FIG. 17, and detaching the tip of the stylus 2 from the surface of the LCD 28.

Figure 18:
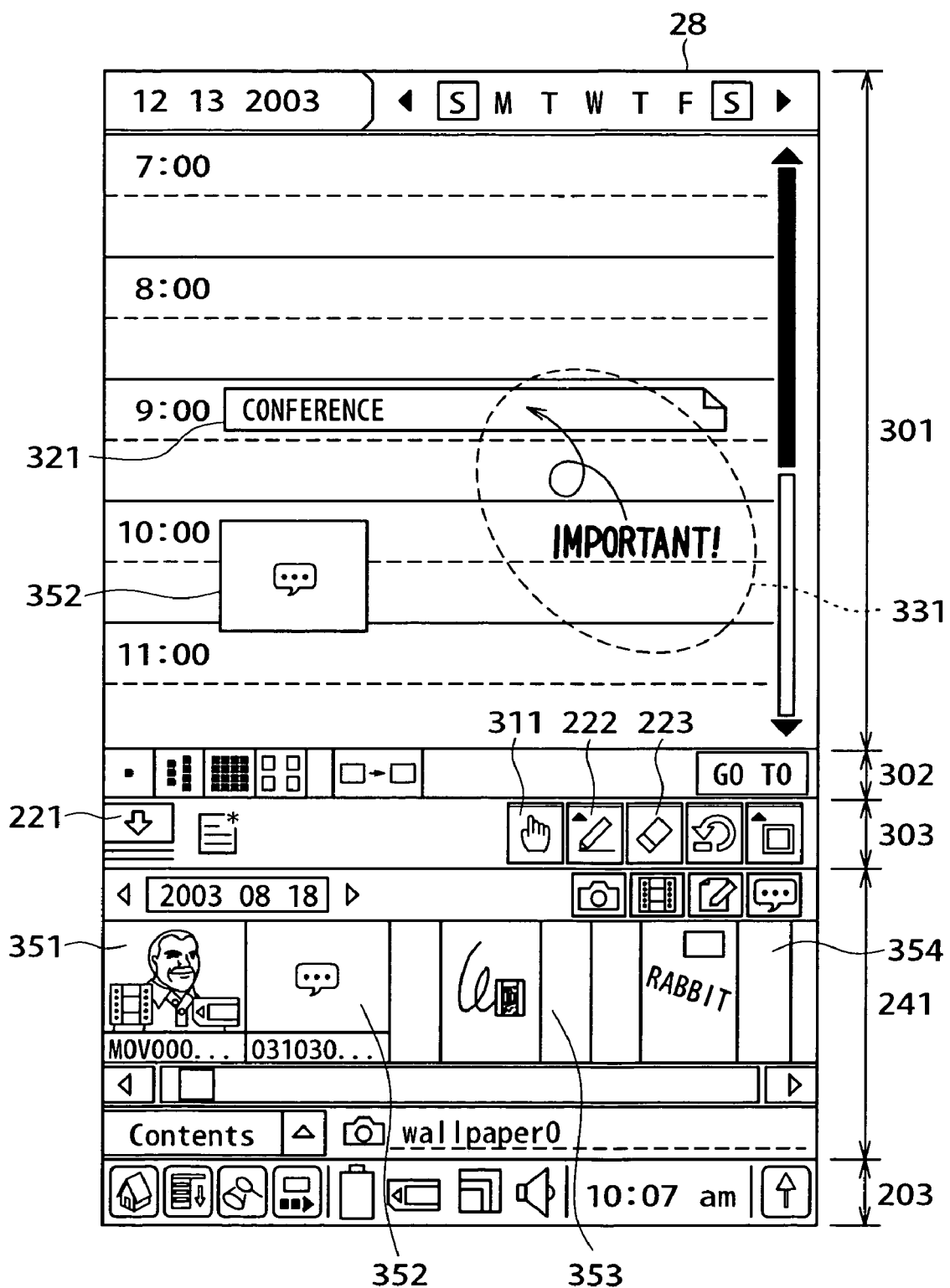
FIG. 18 is a diagram showing an example of the schedule creating screen.

FIG. 18 is a diagram showing an example of a screen on which the thumbnail image 352 of the audio content is pasted at the position P2.

Thus, the user can paste thumbnail images of contents in various categories to the schedule (the user can associate the contents with the schedule) by dragging and dropping the contents from the displayed list.

Since the thumbnail image can be pasted to the schedule as described above, by pasting the thumbnail image 352 of the audio content recorded during the conference from nine o'clock (the "conference" in the plan 321 in FIG. 18) in the vicinity of the plan 321 when the conference ends, for example, the user can later find the audio content recorded during the conference easily.

In addition, the pasting of the thumbnail image is a very intuitive operation of only dragging and dropping the thumbnail image from among the thumbnail images displayed in the thumbnail display area 241.

Furthermore, since reproduction of the audio content represented by the thumbnail image 352 can be started by tapping the thumbnail image 352 pasted to the schedule, the user can readily reproduce the sound recorded during the conference from the schedule.

Incidentally, thumbnail images 353 and 354 in FIG. 17 and FIG. 18 are thumbnail images of memos created in advance. Since memos created in advance can be associated with a schedule at the time of creating the schedule, as described above, the thumbnail images of the memos are also displayed in the thumbnail display area 241.

FIGS. 19A to 19E are diagrams showing a layered structure of the schedule thus created.

Figure 19A:
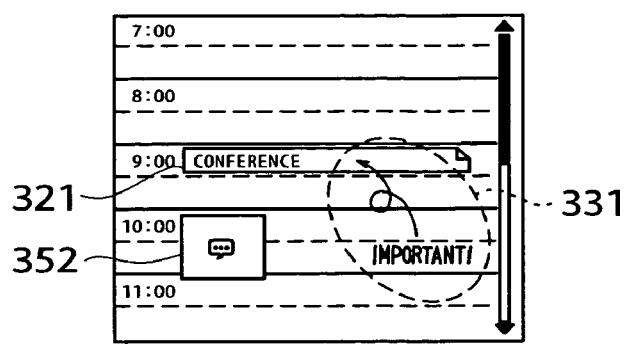
FIGS. 19A, 19B, 19C, 19D, and 19E are diagrams showing an example of layers including the screen of FIG. 17.

FIG. 19A is a diagram showing a screen displayed in the schedule input area 301 in FIG. 18 (a part excluding a year, a month, and a day and days of the week (S, M, T, W, T, F, and S) displayed in an upper part of FIG. 18).

The screen of FIG. 19A also includes a plurality of layers. A layer displaying time periods as shown in FIG. 19B (a layer of a schedule having no plans input therein like the schedule input area 301 in FIG. 14) is disposed in a lowermost layer of the plurality of layers.

Figure 19B:
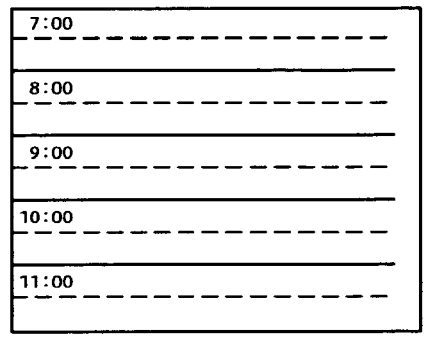
Figure 19C:
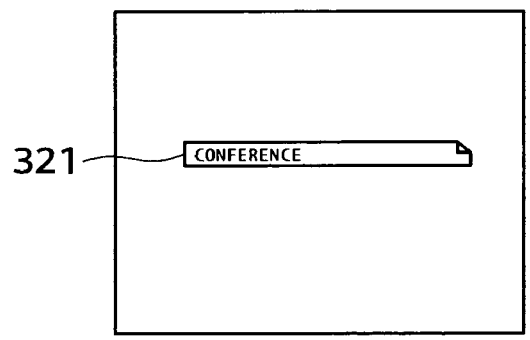
Figure 19D:
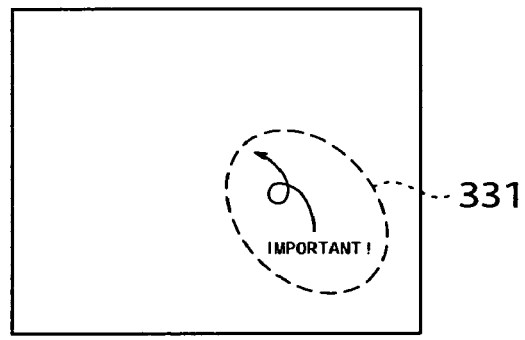

As shown in FIG. 19C, a layer displaying the plan 321 (the plan inputted in the time period of nine o'clock in FIG. 19B) inputted by the user is disposed on the layer of FIG. 19B. As shown in FIG. 19D, a layer displaying the image 331 of the handwritten characters "IMPORTANT!" and the arrow indicating the plan 321 inputted by the stylus 2 is disposed on the layer displaying the plan 321.

Figure 19E:
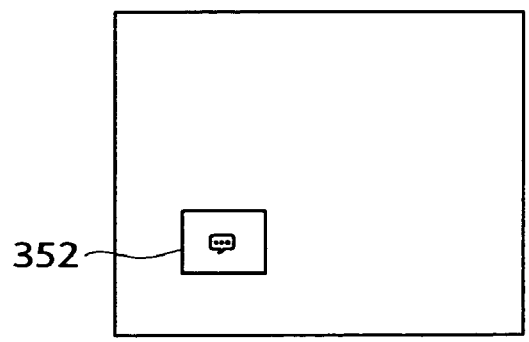

As shown in FIG. 19E, a layer displaying the thumbnail image 352 is disposed as an uppermost layer of the screen of FIG. 19A.

Thus, the screen displayed in the schedule input area 301 by the software for managing the creation of the schedule includes the four layers of FIGS. 19B to 19E. The number of layers (four layers) is different from the number of layers (three layers) including a screen displayed by the software for managing creation of memos as described above.

That is, it can be said that the area to which a thumbnail image displayed in the thumbnail display area 241 is pasted differs according to the category of data created by using a screen displayed simultaneously with a list of thumbnail images, and that there are a plurality of areas to which a thumbnail image displayed in the thumbnail display area 241 is pasted.

A software configuration for realizing screen display as described above will next be described.

In the following, one memo file created by the software for managing creation of a memo and one schedule file created by the software for managing creation of a schedule will be referred to also as a database. Therefore an area to which contents are pasted and in which handwritten characters are input is a database.

Figure 20:
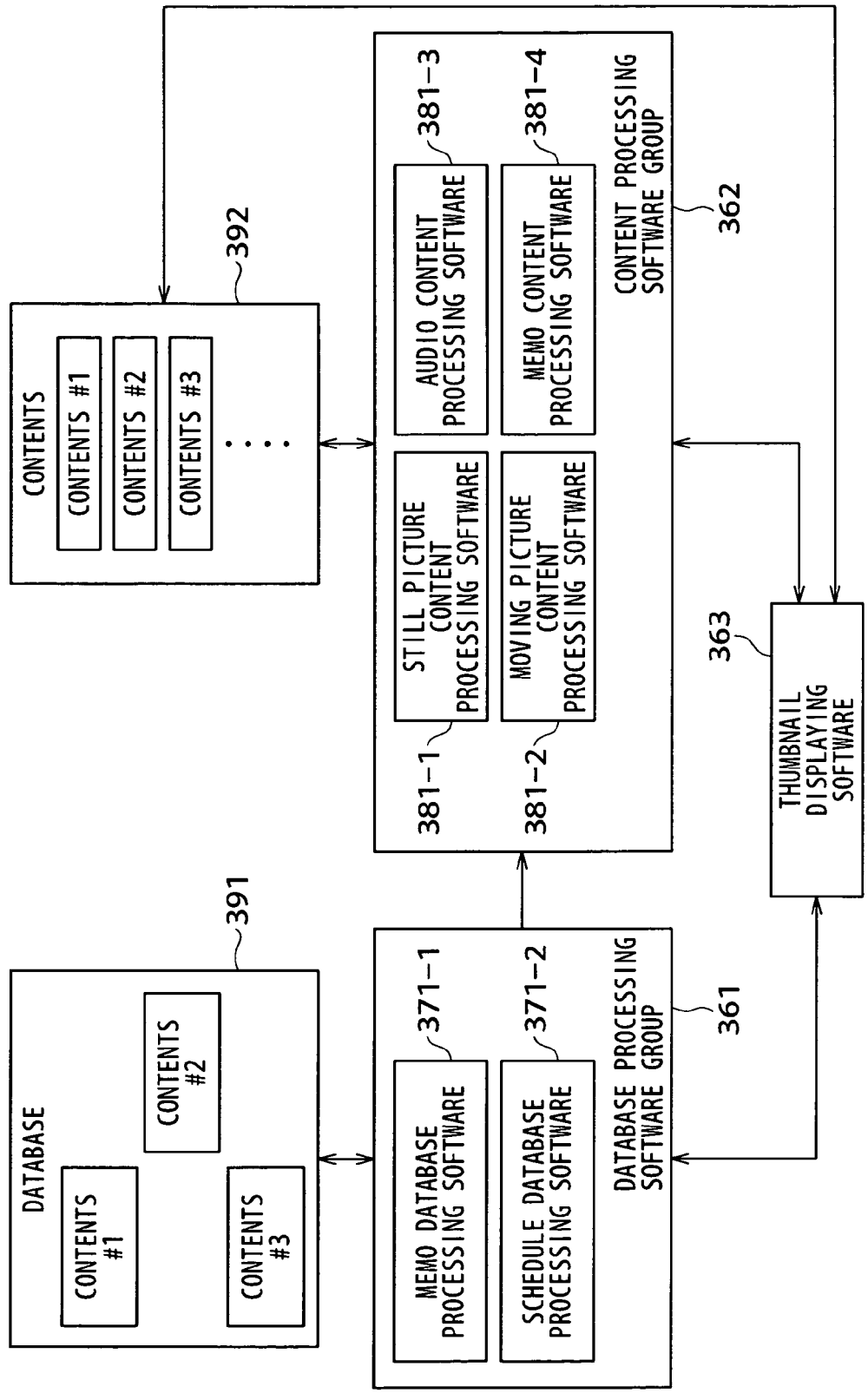
FIG. 20 is a block diagram showing an example of software configuration provided in the PDA.

FIG. 20 is a block diagram showing an example of software provided in the PDA 1.

These pieces of software are stored in the built-in memory of the storage unit 139 (FIG. 5) or the like. The PDA 1 is provided with a database processing software group 361 including a plurality of pieces of database processing software, a content processing software group 362 including a plurality of pieces of content processing software, and thumbnail displaying software 363.

The database processing software group 361 includes memo database processing software 371-1 for managing creation of memo databases and schedule database processing software 371-2 for managing creation of schedule databases. When the memo database processing software 371-1 and the schedule database processing software 371-2 do not need to be individually differentiated from each other, the memo database processing software 371-1 and the schedule database processing software 371-2 will be referred to collectively as database processing software 371.

It is to be noted that while only two pieces of database processing software are provided in FIG. 20, database processing software is in practice provided for each piece of software that has an application icon 204 provided therefor in the screen of FIG. 6 and which is related to database creation.

The database processing software 371 provides the user with a function of creating a database. The database processing software 371 receives input of handwritten characters by the stylus 2 and a pasted thumbnail image, for example, and creates a database.

The database processing software 371 manages creation of each database using database component information that shows a database structure as shown in FIG. 21.

In the example of FIG. 21, the database component information shows a type of content represented by a thumbnail image pasted to the database, a location to which the thumbnail image is linked (a location where data of the content proper is stored), coordinates indicating a position where the thumbnail image is pasted on the database, and other information about the content.

These pieces of information are registered with the database component information each time a thumbnail image is pasted or a handwritten character is input. Registered in a second row of the database component information in the example of FIG. 21 are link information #1 as a location to which a handwritten character input in a certain database is linked, and coordinates ($x_1$, $y_1$) as a position where the handwritten character is input. Also registered are a width $w_1$ and a height $h_1$ of the handwritten character, and a color of the handwritten character, a thickness of a pen and the like as other information.

Similarly, link information, a position, width, height, and other information of a thumbnail image of each of a moving picture content, a still picture content, text, and an audio content pasted to the same database are registered. Incidentally, the "text" shown in FIG. 21 as an input in the database is a plan input in the database of a schedule, for example. "Coordinates" registered in the database component information are for example coordinates of an upper left corner of a thumbnail image.

Returning to description of FIG. 20, contents #1 to #3 are associated with a database 391 managed by the database processing software 371 (thumbnail images of the contents #1 to #3 are pasted to the database 391).

That is, in this case, the database processing software 371 manages types of the contents #1 to #3 associated with the database 391, link information of the thumbnail images, pasted positions of the thumbnail images, and other information, using database component information.

When a thumbnail image pasted to the database 391 is tapped to give an instruction to reproduce the content, the database processing software 371 requests one of the pieces of content processing software including the content processing software group 362 to reproduce the content.

Also, when the user operates the list display button 221 to give an instruction to display a list of thumbnail images to be pasted to the database 391 being created, the database processing software 371 notifies it to the thumbnail displaying software 363 to display a list of thumbnail images.

The content processing software group 362 includes: still picture content processing software 381-1 for managing reproduction (preview) of still picture contents; moving picture content processing software 381-2 for managing reproduction of moving picture contents; audio content processing software 381-3 for managing reproduction of audio contents; and memo content processing software 381-4 for managing reproduction (preview) of memos prepared as contents. When the still picture content processing software 381-1 to the memo content processing software 381-4 do not need to be individually differentiated from each other, the still picture content processing software 381-1 to the memo content processing software 381-4 will be referred to collectively as content processing software 381.

The content processing software 381 manages all contents 392 stored in the storage unit 139 and the MS 3, and provides a content viewer function. When the database processing software 371 makes a request to reproduce a still picture content, the still picture content processing software 381-1 reproduces the still picture content. When the database processing software 371 makes a request to reproduce a moving picture content, the moving picture content processing software 381-2 reproduces the moving picture content. When the database processing software 371 makes a request to reproduce an audio content, the audio content processing software 381-3 reproduces the audio content. When the database processing software 371 makes a request to reproduce a memo, the memo content processing software 381-4 reproduces the memo.

Incidentally, the reproduction of the memo may be performed by the database processing software 371 that created the memo (the memo database processing software 371-1).

As described above, the user can reproduce a content by tapping a thumbnail image displayed in a list in the thumbnail display area 241. When a thumbnail image displayed in the thumbnail display area 241 is tapped, the thumbnail displaying software 363 notifies it to the content processing software 381 so that the content processing software 381 reproduces the content according to a category of the content specified for reproduction.

When the database processing software 371 requests display of a list of thumbnail images, the thumbnail displaying software 363 refers to the contents 392 to generate thumbnail images representing the respective contents, and then displays a list of the thumbnail images in the thumbnail display area 241. Also, when a request is made to limit categories of the contents displayed as the thumbnail images in the list (when one of the category selecting buttons 261 to 264 is operated), the thumbnail displaying software 363 updates the display of the thumbnail images according to the request.

Further, when a thumbnail image displayed in the thumbnail display area 241 is tapped, the thumbnail displaying software 363 requests the content processing software 381 to reproduce the content.

Figure 22:
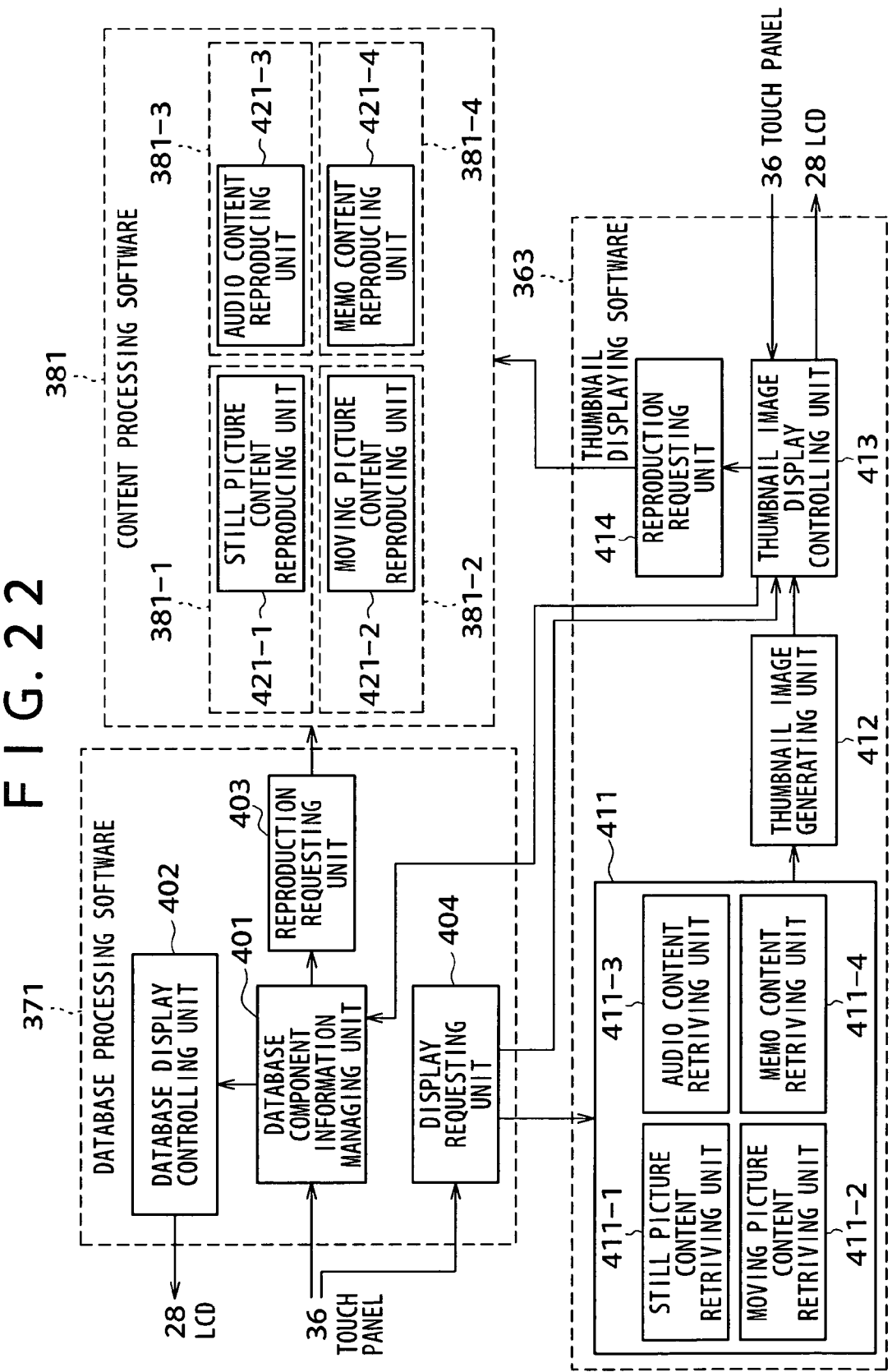
FIG. 22 is a block diagram showing an example of functional configuration.

FIG. 22 is a block diagram showing an example of functional configuration of the PDA 1 implemented by executing each piece of software in FIG. 20.

A database component information managing unit 401 implemented by the database processing software 371 manages database component information as shown in FIG. 21 on the basis of input from the user which input is detected by the touch panel 36, and supplies the database component information to a database display controlling unit 402 as required.

When the database component information managing unit 401 detects on the basis of output from the touch panel 36 that a thumbnail image pasted to a database is tapped to give an instruction to reproduce the content, the database component information managing unit 401 notifies it to the reproduction requesting unit 403.

The database display controlling unit 402 controls display of the memo creating area 211 in FIG. 7 and the schedule input area 301 in FIG. 14 according to the information supplied from the database component information managing unit 401.

For example, when the database component information of FIG. 21 is supplied from the database component information managing unit 401, the database display controlling unit 402 displays the handwritten character (the information registered in the second row) with the color and the thickness indicated by the other information at the position represented by the coordinates $(x_1, y_1)$, and also displays the thumbnail images and the like of the other contents in the predetermined sizes at the predetermined positions on the database. Information indicating the sizes of the thumbnail images is described as other information in FIG. 21, for example.

When a thumbnail image of a still picture content is tapped, the reproduction requesting unit 403 requests a still picture content reproducing unit 421-1 implemented by the still picture content processing software 381-1 to reproduce the still picture content. When a thumbnail image of a moving picture content is tapped, the reproduction requesting unit 403 requests a moving picture content reproducing unit 421-2 implemented by the moving picture content processing software 381-2 to reproduce the moving picture content.

When a thumbnail image of an audio content is tapped, the reproduction requesting unit 403 requests an audio content reproducing unit 421-3 implemented by the audio content processing software 381-3 to reproduce the audio content. When a thumbnail image of a memo is tapped, the reproduction requesting unit 403 requests a memo content reproducing unit 421-4 implemented by the memo content processing software 381-4 to reproduce the memo.

A display requesting unit 404 detects operation of the list display button 221 by the user. When an instruction to display a list of thumbnail images is given, the display requesting unit 404 requests a retrieving unit 411 implemented by the thumbnail displaying software 363 to display a list of thumbnail images. On the other hand, when an instruction to close a list of thumbnail images is given, the display requesting unit 404 requests a thumbnail image display controlling unit 413 to close the list of thumbnail images.

The retrieving unit 411 implemented by the thumbnail displaying software 363 includes: a still picture content retrieving unit 411-1 for retrieving still picture contents; a moving picture content retrieving unit 411-2 for retrieving moving picture contents; an audio content retrieving unit 411-3 for retrieving audio contents; and a memo content retrieving unit 411-4 for retrieving memos. Thus, the PDA 1 is provided with a functional unit for retrieving contents for each category of contents.

Each of the still picture content retrieving unit 411-1 to the memo content retrieving unit 411-4 retrieves contents in response to a request to display a list of thumbnail images from the display requesting unit 404 of the database processing software 371, and then outputs a result of the retrieval to a thumbnail image generating unit 412. The still picture content retrieving unit 411-1 to the memo content retrieving unit 411-4 retrieve contents from the MS 3, the CF 4, and the storage unit 139 when the MS 3 and the CF 4 are loaded in the PDA 1, and retrieve contents from only the storage unit 139 when the MS 3 and the CF 4 are not loaded in the PDA 1.

On the basis of the results of the retrieval supplied from the retrieving unit 411 (the still picture content retrieving unit 411-1 to the memo content retrieving unit 411-4), the thumbnail image generating unit 412 generates a thumbnail image of each content. As described above, for example, the thumbnail image generating unit 412 generates an image obtained by reducing a still picture as a thumbnail image of a still picture content, and generates an image obtained by reducing an image of a first frame as a thumbnail image of a moving picture content. The thumbnail image generated by the thumbnail image generating unit 412 is output to the thumbnail image display controlling unit 413.

Incidentally, the thumbnail image generating unit 412 that generates the thumbnail image may be implemented by the content processing software 381. In this case, the thumbnail image generating unit 412 of the content processing software 381 is notified of a result of retrieval of contents by the retrieving unit 411, and then generates thumbnail images according to the notification. The generated thumbnail images are supplied to the thumbnail image display controlling unit 413 of the thumbnail displaying software 363 to be displayed on the LCD 28.

The thumbnail image display controlling unit 413 displays a list of the thumbnail images supplied from the thumbnail image generating unit 412 in the thumbnail display area 241. Also, when the thumbnail image display controlling unit 413 detects on the basis of output from the touch panel 36 that one of the category selecting buttons 261 to 264 is operated, the thumbnail image display controlling unit 413 updates the display of the list so as to exclude thumbnail images of contents in a category corresponding to the operated button.

Further, when the thumbnail image display controlling unit 413 detects on the basis of output from the touch panel 36 that the user taps a thumbnail image displayed in the thumbnail display area 241 to give an instruction to reproduce the content, the thumbnail image display controlling unit 413 notifies it to the reproduction requesting unit 414.

As with the reproduction requesting unit 403 of the database processing software 371, the reproduction requesting unit 414 makes a request to reproduce the content to one of the still picture content reproducing unit 421-1 to the memo content reproducing unit 421-4 according to a category of the content that the instruction is given to reproduce.

Operation of the PDA 1 will next be described with reference to flowcharts.

A database creating process performed by the database processing software 371 will first be described with reference to a flowchart of FIG. 23.

In step S1, the database component information managing unit 401 determines on the basis of output from the touch panel 36 whether there is an input by the user such for example as input of a handwritten character and pasting of a thumbnail image.

When the database component information managing unit 401 determines in step S1 that there is an input by the user, the process proceeds to step S2, where the database component information managing unit 401 updates database component information managed by the database component information managing unit 401 itself according to the input. Also, in step S2, as the database component information managing unit 401 updates the database component information, the database display controlling unit 402 reflects the update in display of the database.

Thereby, when the user inputs a curved handwritten character, for example, coordinates indicating a position where the handwritten character is input, a color, and a thickness of the pen are registered in the database component information.

Also, the newly registered information is reflected in the display of the database, and thus an image 231 as shown in FIG. 8 is displayed on the LCD 28.

When the database component information managing unit 401 determines in step S1 that there is no input from the user, the process of step S2 is skipped.

In step S3, the display requesting unit 404 determines whether a list of thumbnail images is already displayed. When the display requesting unit 404 determines that a list of thumbnail images is not displayed yet, the process proceeds to step S4.

In step S4, the display requesting unit 404 determines on the basis of output from the touch panel 36 whether an instruction to display a list of thumbnail images is given.

When the display requesting unit 404 determines in step S4 that an instruction to display a list of thumbnail images is given as the list display button 221 is operated, the process proceeds to step S5, where the display requesting unit 404 requests the thumbnail displaying software 363 (retrieving unit 411) to display a list of thumbnail images.

In response to the request, the thumbnail displaying software 363 displays a list of thumbnail images. Details of a process performed by the thumbnail displaying software 363 will be described with reference to a flowchart of FIG. 24.

In step S6, the database component information managing unit 401 determines whether pasting of a thumbnail image to the database is notified from the thumbnail image display controlling unit 413 of the thumbnail displaying software 363. When a thumbnail image selected from the list of thumbnail images displayed in the thumbnail display area 241 is pasted to the memo creating area 211, for example, by a drag and drop, the thumbnail image display controlling unit 413 notifies it to the database component information managing unit 401 (step S31 in FIG. 24).

When the database component information managing unit 401 determines in step S6 that pasting of a thumbnail image to the database is notified, the process proceeds to step S7, where the database component information managing unit 401 updates the database component information. Also at this time, the update of the database component information is reflected in the display of the database by the database display controlling unit 402.

Thereby, when an thumbnail image 253 is pasted from the thumbnail display area 241 to a position P1 by a drag and drop as shown in FIG. 9, for example, link information indicating a location where data of a content proper represented by the thumbnail image 253 is recorded, coordinates of the position P1, and the like are registered in the database component information, and the update is reflected in the display of the database (FIG. 10).

When the display requesting unit 404 determines in step S4 that no instruction to display a list of thumbnail images is given, the process of steps S5 to S7 is skipped. Also, when the database component information managing unit 401 determines in step S6 that pasting of a thumbnail image is not notified, the process of step S7 is skipped.

On the other hand, when the display requesting unit 404 determines in step S3 that a list of thumbnail images is already displayed, the process proceeds to step S8, where the display requesting unit 404 determines whether an instruction to close the list of thumbnail images is given. By operating the list display button 221 when a list of thumbnail images is displayed, the user can close the list of thumbnail images.

When the display requesting unit 404 determines in step S8 that no instruction to close the list of thumbnail images being displayed is given, the process proceeds to step S6 to perform the process from step S6 on down.

When the display requesting unit 404 determines in step S8 that an instruction to close the list is given, the process proceeds to step S9, where the display requesting unit 404 requests the thumbnail image display controlling unit 413 of the thumbnail displaying software 363 to close the list of thumbnail images. In response to the request, the thumbnail displaying software 363 makes display of the list of thumbnail images disappear. Then the process proceeds to step S10.

In step S10, the database component information managing unit 401 determines whether an instruction to reproduce a content pasted to the database is given by the user. When a thumbnail image pasted to the database is tapped and thus the database component information managing unit 401 determines that an instruction to reproduce the content represented by the thumbnail image is given, the database component information managing unit 401 notifies it to the reproduction requesting unit 403.

The reproduction requesting unit 403 requests the content processing software 381 to reproduce the content in step S11. When a thumbnail image of a still picture content is tapped, the reproduction requesting unit 403 requests the still picture content reproducing unit 421-1 to reproduce the still picture content. When a thumbnail image of a moving picture content is tapped, the reproduction requesting unit 403 requests the moving picture content reproducing unit 421-2 to reproduce the moving picture content. When a thumbnail image of an audio content is tapped, the reproduction requesting unit 403 requests the audio content reproducing unit 421-3 to reproduce the audio content. When a thumbnail image of a memo is tapped, the reproduction requesting unit 403 requests the memo content reproducing unit 421-4 to reproduce the memo.

The database component information managing unit 401 determines in step S12 whether to end the creation of the database. When the database component information managing unit 401 determines that the creation of the database is not to be ended, the process returns to step S1 to repeat the process from step S1 on down.

On the other hand, when the database component information managing unit 401 determines in step S12 that the creation of the database is to be ended because an instruction to return to the main screen of FIG. 6 is given, for example, the database component information about the database being created is stored in the storage unit 139 or the like, and then the process is ended.

A thumbnail image display controlling process performed by the thumbnail displaying software 363 will next be described with reference to a flowchart of FIG. 24.

Figure 23:
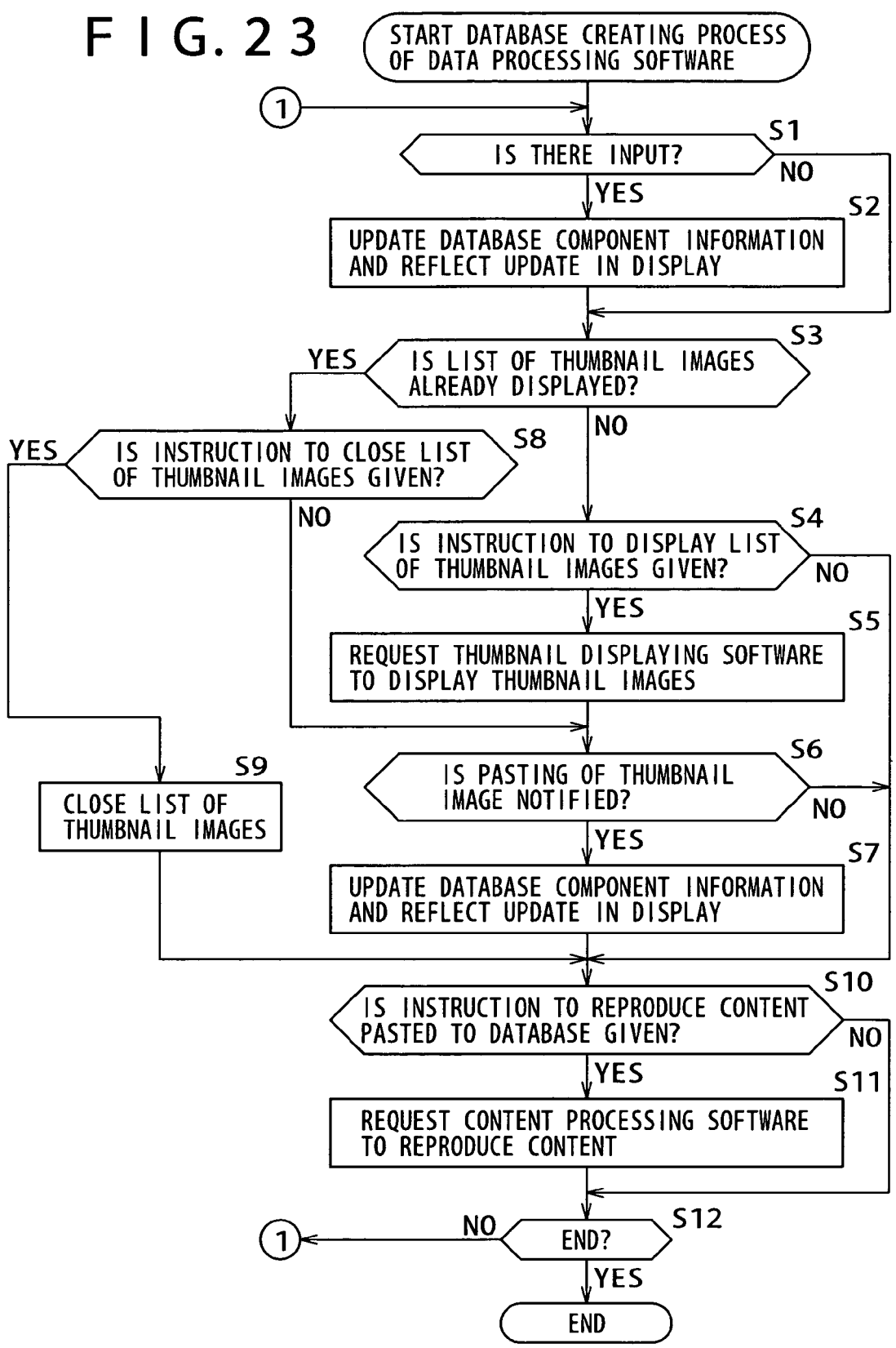
FIG. 23 is a flowchart of assistance in explaining a database creating process of database processing software.

The process is started when there is a request from the display requesting unit 404 of the database processing software 371 (step S5 in FIG. 23).

In step S21, the retrieving unit 411 retrieves contents in all categories that can be pasted to a database from contents stored in the storage unit 139, the MS 3 and the like.

Specifically, the still picture content retrieving unit 411-1 retrieves still picture contents. The moving picture content retrieving unit 411-2 retrieves moving picture contents. The audio content retrieving unit 411-3 retrieves audio contents. The memo content retrieving unit 411-4 retrieves memo contents. A result of the retrieval of each of the still picture content retrieving unit 411-1 to the memo content retrieving unit 411-4 is output to the thumbnail image generating unit 412.

The thumbnail image generating unit 412 in step S22 generates thumbnail images of contents in each category. The thumbnail image generating unit 412 then outputs the generated thumbnail images to the thumbnail image display controlling unit 413. When the thumbnail image generating unit 412 is implemented by the content processing software 381 as described above, the result of the retrieval in step S21 is notified to the thumbnail image generating unit 412 to generate the thumbnail images.

In step S23, the thumbnail image display controlling unit 413 displays a list of the thumbnail images. Thereby, as shown in FIG. 9, the thumbnail display area 241 is formed on the LCD 28, and the list of the thumbnail images is displayed in the thumbnail display area 241.

In step S24, the thumbnail image display controlling unit 413 determines on the basis of output from the touch panel 36 whether a category of thumbnail images is selected. When one of the category selecting buttons 261 to 264 is operated and thus the thumbnail image display controlling unit 413 determines that a category is selected, the process proceeds to step S25.

In step S25, the thumbnail image display controlling unit 413 updates the display of the thumbnail images according to an input by the user. When the category selecting button 261 is operated, for example, the thumbnail image display controlling unit 413 updates the display by excluding thumbnail images of still picture contents from the already displayed thumbnail images. When the category selecting button 262 is operated, the thumbnail image display controlling unit 413 updates the display by excluding thumbnail images of moving picture contents. When the category selecting buttons 263 and 264 are operated, the thumbnail image display controlling unit 413 similarly updates the display by excluding thumbnail images of memos and audio contents.

When the thumbnail image display controlling unit 413 determines in step S24 that no category is selected, the process of step S25 is skipped.

In step S26, the thumbnail image display controlling unit 413 determines on the basis of output from the touch panel 36 whether an instruction to reproduce a content a thumbnail image of which is displayed in the thumbnail display area 241 is given.

When a thumbnail image is tapped and therefore the thumbnail image display controlling unit 413 determines in step S26 that an instruction to reproduce a content represented by the thumbnail image is given, the thumbnail image display controlling unit 413 notifies it to the reproduction requesting unit 414.

The reproduction requesting unit 414 in step S27 requests the content processing software 381 to reproduce the content. When a thumbnail image of a still picture content is tapped, the reproduction requesting unit 414 requests the still picture content reproducing unit 421-1 to reproduce the still picture content. When a thumbnail image of a moving picture content is tapped, the reproduction requesting unit 414 requests the moving picture content reproducing unit 421-2 to reproduce the moving picture content. When a thumbnail image of an audio content is tapped, the reproduction requesting unit 414 requests the audio content reproducing unit 421-3 to reproduce the audio content. When a thumbnail image of a memo is tapped, the reproduction requesting unit 414 requests the memo content reproducing unit 421-4 to reproduce the memo.

When the thumbnail image display controlling unit 413 determines in step S26 that no instruction to reproduce a content is given, the process of step S27 is skipped.

In step S28, the thumbnail image display controlling unit 413 determines whether the tip of the stylus 2 is pressed on a thumbnail image displayed in the thumbnail display area 241. When the thumbnail image display controlling unit 413 determines that the tip of the stylus 2 is pressed on a thumbnail image, the process proceeds to step S29, where a display position of the thumbnail image is moved in synchronism with movement of the stylus 2.

In step S30, the thumbnail image display controlling unit 413 determines whether the pressing of the tip of the stylus 2 on the thumbnail image is ended, that is, whether the tip of the stylus 2 is detached from the surface of the LCD 28. When the thumbnail image display controlling unit 413 determines that the tip of the stylus 2 is not detached from the surface of the LCD 28, the process returns to step S29 to repeat moving the display position.

On the other hand, when the thumbnail image display controlling unit 413 determines in step S30 that the tip of the stylus 2 is detached from the surface of the LCD 28 and that the thumbnail image is moved onto the database being created, the process proceeds to step S31, where the thumbnail image display controlling unit 413 requests the database component information managing unit 401 of the database processing software 371 to paste the thumbnail image.

At this time, various information such as information indicating a position to which the thumbnail image is moved, link information of the thumbnail image, and the like is notified from the thumbnail image display controlling unit 413 to the database component information managing unit 401.

After such notification of the pasting of the thumbnail image is given, or when the thumbnail image display controlling unit 413 determines in step S28 that the tip of the stylus 2 is not pressed on a thumbnail image, the process proceeds to step S32.

In step S32, the thumbnail image display controlling unit 413 determines whether closing of the list of thumbnail images is requested. When the thumbnail image display controlling unit 413 determines that the closing of the list of thumbnail images is not requested, the process returns to step S26 to repeat the process from step S26 on down.

When the thumbnail image display controlling unit 413 determines in step S32 that the closing of the list of thumbnail images is requested, the thumbnail image display controlling unit 413 closes the list, and the process is ended. This request is notified from the display requesting unit 404 of the database processing software 371 (step S9 in FIG. 23).

Figure 25:
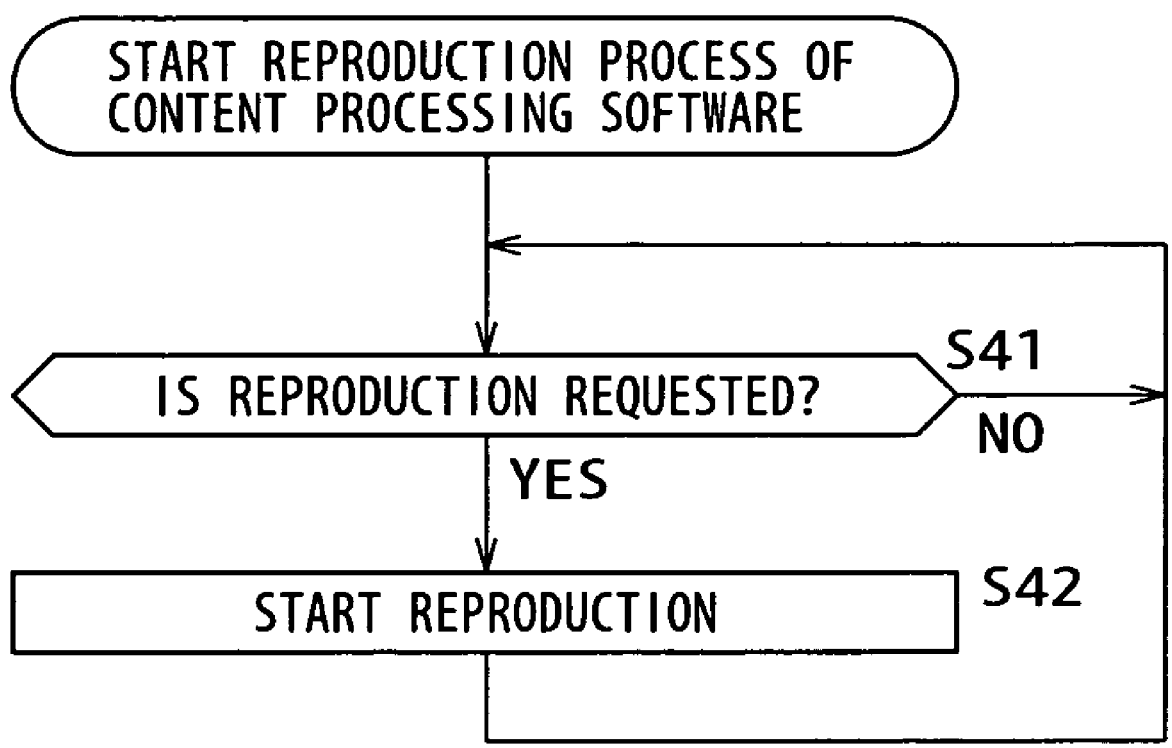
FIG. 25 is a flowchart of assistance in explaining a reproduction process of content processing software.

A content reproduction process performed by the content processing software 381 will next be described with reference to a flowchart of FIG. 25.

When this process is performed by the still picture content processing software 381-1, for example, the still picture content reproducing unit 421-1 determines in step S41 whether reproduction (preview) of a still picture content is requested. The still picture content reproducing unit 421-1 stands by until the still picture content reproducing unit 421-1 determines that reproduction of a still picture content is requested.

Figure 24:
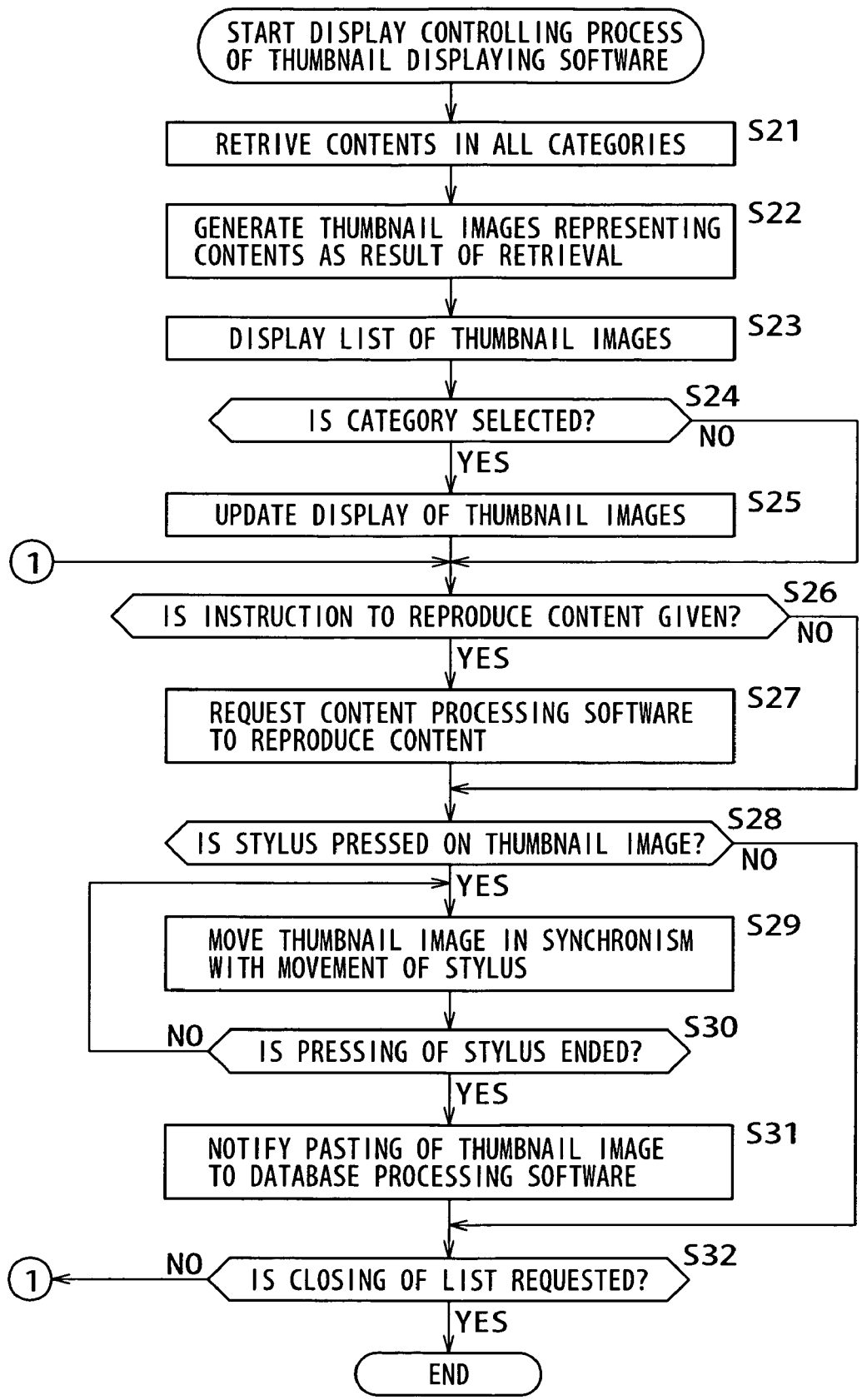
FIG. 24 is a flowchart of assistance in explaining a display controlling process of thumbnail displaying software.

When a thumbnail image of a still picture content pasted to a database is tapped, or when a thumbnail image of a still picture content displayed in the thumbnail display area 241 is tapped, reproduction of the still picture content is requested from the reproduction requesting unit 403 of the database processing software 371 or the reproduction requesting unit 414 of the thumbnail displaying software 363 (step S11 in FIG. 23 or step S27 in FIG. 24). The request from the reproduction requesting unit 403 or the reproduction requesting unit 414 includes information indicating a position where the content proper is stored, and the like.

Incidentally, instead of starting the reproduction of the content immediately when the thumbnail image is tapped, the reproduction of the content may be started after a menu showing operations selectable by the user to be performed on the tapped content is displayed when the thumbnail image is tapped and an operation is selected from the menu. The menu displayed when the thumbnail image is tapped has "reproduce contents/peel/enlarge/reduce/delete," for example, as operations selectable by the user.

When the still picture content reproducing unit 421-1 determines in step S41 that reproduction of a still picture content is requested, the process proceeds to step S42, where the still picture content reproducing unit 421-1 obtains data of the content proper on the basis of the information included in the request from the reproduction requesting unit 403 or the reproduction requesting unit 414, and starts reproduction of the content.

Thereby a preview of a still picture as shown in FIG. 11, for example, is displayed on the LCD 28. The still picture content reproducing unit 421-1 repeats the above process to reproduce still picture contents.

The moving picture content reproducing unit 421-2, the audio content reproducing unit 421-3, and the memo content reproducing unit 421-4 perform a similar process on contents of the respective categories.

While in the above description, contents pasted to a database are contents of still pictures, moving pictures, audio, and memos (at the time of creation of a schedule), contents that can be pasted to a database are not limited to these. Various information such as application icons 204 in FIG. 6 and images provided in advance for pasting (for example images of stars), for example, may be pasted as contents. For example, by pasting an application icon 204 to a memo and using the memo, the software can be started directly from the displayed memo.

In addition, so-called PIM (Personal Information Manager) information such as one plan item registered in a schedule, one piece of address information registered in an address book, and the like may be pasted to a database as contents.

Further, while in the above description, the pasting of contents to a database as described above is performed in the PDA 1, the pasting of contents to a database as described above may be performed in various other devices such as portable telephones, notebook type personal computers, and the like.

The series of processes described above can be carried out not only by hardware but also by software.

When the series of processes is to be carried out by software, a program constituting the software is installed from a network or a recording medium onto a computer incorporated in special hardware, or a general-purpose personal computer, for example, that can perform various functions by installing various programs thereon.

As shown in FIG. 5, the recording medium is not only formed by a packaged medium including the MS 3, the CF 4, or the like having the program recorded thereon and distributed to users to provide the program separately from the apparatus proper, but also formed by the ROM 132, the storage unit 139 or the like having the program recorded therein and provided to the user in a state of being preincorporated in the apparatus proper.

It is to be noted that in the present specification, the steps describing the program recorded on the recording medium include not only processes carried out in time series in the described order but also processes carried out in parallel or individually and not necessarily in time series.

While a preferred embodiment of the present invention has been described using specific terms, such description is for illustrative purposes only, and it is to be understood that changes and variations may be made without departing from the spirit or scope of the following claims.

What is claimed is:

1. An information-processing apparatus, comprising:
a processing unit configured to retrieve all content data that can be pasted to a displayed database, each of the content data being in a respective one of a plurality of categories, each of the plurality of categories being defined by a different one of a plurality of applications that reproduces the content data in the category;
a display control unit configured to control a display unit to display a plurality of representations in a first area of the display unit when an interface receives a first instruction, each of the plurality of representations representing a different one of the content data, to control the display unit to display a pasted one of the plurality of representations in a second area of the display unit when the interface receives a second instruction defined by a dragging operation on one of the plurality of representations from the first area to the second area, and to update the plurality of representations in the first area by excluding all of the plurality of representations that represent content data in one of the plurality of categories, in response to a selection, via the interface, of the one of the plurality of categories, wherein
the processing unit is further configured to request the one of the plurality of applications defining the category of the content data represented by the pasted one of the plurality of representations to reproduce the content data represented by the pasted one of the plurality of representations upon an operation on the pasted one of the plurality of representations displayed in the second area.

2. The information-processing apparatus as claimed in claim 1, wherein the display control unit is further configured to control the display unit to display the first area within the second area, when the interface receives the first instruction.

3. The information-processing apparatus as claimed in claim 1, wherein the display control unit is further configured to control the display unit to change a number of the plurality of representations displayed in the first area, based on one of the plurality of applications reproducing the displayed database.

4. The information-processing apparatus as claimed in claim 3, wherein the display control unit is configured to control the display unit to change the number of the plurality of representations displayed in the first area, based on the one of the plurality of applications reproducing the displayed database and the one of the plurality of applications defining the category of the one of the content data represented by one of the plurality of representations.

5. The information-processing apparatus as claimed in claim 3, wherein the display control unit is configured to control the display unit to stop displaying, in the first area, the one of the plurality of representations, based on the one of the plurality of applications reproducing the displayed database and the one of the plurality of applications defining the category of the one of the content data represented by the one of the plurality of representations.

6. The information-processing apparatus as claimed in claim 1, wherein, when the displayed database is in a same one of the plurality of categories as is one of the content data, the one of the plurality of representations representing the one of the content data is not displayed in the first area.

7. The information-processing apparatus as claimed in claim 1, wherein the display control unit is configured to control the display unit to display, in the second area, in respective layers, at least two of the plurality of representations, the respective layers corresponding to one of the plurality of applications reproducing the displayed database.

8. The information-processing apparatus as claimed in claim 7, wherein the display control unit is configured to control the display unit to display, in the second area, the respective layers in an order based on the one of the plurality of applications reproducing the displayed database.

9. An information-processing apparatus, comprising:

processing means for retrieving all content data that can be pasted to a displayed database, each of the content data being in a respective one of a plurality of categories, each of the plurality of categories being defined by a different one of a plurality of applications that reproduces the content data in the category;

control means for controlling a display unit to display a plurality of representations in a first area of the display unit when an interface receives a first instruction, each of the plurality of representations representing a different one of the content data, for controlling the display unit to display a pasted one of the plurality of representations in a second area of the display unit when the interface receives a second instruction defined by a dragging operation on one of the plurality of representations from the first area to the second area, and for updating the plurality of representations in the first area by excluding all of the plurality of representations that represent content data in one of the plurality of categories, in response to a selection, via the interface, of the one of the plurality of categories, wherein the processing means requests the one of the plurality of the applications defining the category of the content data represented by the pasted one of the plurality of representations to reproduce the content data represented by the pasted one of the plurality of representations upon an operation on the pasted one of the plurality of representations displayed in the second area.

10. The information-processing apparatus as claimed in claim 9, wherein the control means controls the display unit to stop displaying, in the first area, the one of the plurality of representations, based on one of the plurality of applications reproducing the displayed database and one of the plurality of applications defining the category of the one of the content data represented by the one of the plurality of representations.

11. The information-processing apparatus as claimed in claim 9, wherein, when the displayed database is in a same one of the plurality of categories as is one of the content data, the one of the plurality of representations representing the one of the content data is not displayed in the first area.

12. The information-processing apparatus as claimed in claim 9, wherein the control means controls the display unit to display, in the second area, in respective layers, at least two of the plurality of representations, the respective layers being displayed in an order based on one of the plurality of applications reproducing the displayed database.

13. A computer-readable medium including computer executable instructions, wherein the instructions, when executed by a processor, cause the processor to perform a method comprising:

retrieving all content data that can be pasted to a displayed database, each of the content data being in a respective one of a plurality of categories, each of the plurality of categories being defined by a different one of a plurality of applications that reproduces the content data in the category;

controlling a display unit to display a plurality of representations in a first area of the display unit when a first instruction is received, each of the plurality of representations representing a different one of the content data;

controlling the display unit to display a pasted one of the plurality of representations in a second area of the display unit when a second instruction defined by a dragging operation on one of the plurality of representations from the first area to the second area is received;

updating the plurality of representations in the first area by excluding all of the plurality of representations that represent content data in one of the plurality of categories, in response to a selection of the one of the plurality of categories; and requesting the one of the plurality of applications defining the category of the content data represented by the pasted one of the plurality of representations to reproduce the content data represented by the pasted one of the plurality of representations upon an operation on the pasted one of the plurality of representations displayed in the second area.

14. The computer-readable medium as claimed in claim 13, the method further comprising:

controlling the display unit to stop displaying, in the first area, the one of the plurality of representations, based on one of the plurality of applications reproducing the displayed database and the one of the plurality of applications defining the category of the one of the content data represented by the one of the plurality of representations.

15. The computer-readable medium as claimed in claim 13, wherein, when the displayed database is in a same one of the plurality of categories as is one of the content data, the one of the plurality of representations representing the one of the content data is not displayed in the first area.

16. The computer-readable medium as claimed in claim 13, the method further comprising:

controlling the display unit to display, in the second area, in respective layers, at least two of the plurality of representations, the respective layers being displayed in an order based on one of the plurality of applications reproducing the displayed database.

17. The information-processing apparatus as claimed in claim 1, wherein the display control unit is further configured to control the display unit to display, in the second area, the pasted one of the plurality of representations in a layer associated with one of the plurality of applications reproducing the displayed database and the one of the plurality of applications defining the category of the content data represented by the pasted one of the plurality of representations.

18. The information-processing apparatus as claimed in claim 1, wherein the processing unit is further configured to request the one of the plurality of applications defining the category of the content data represented by the one of the plurality of representations in the first area to reproduce the content data represented by the one of the plurality of representations in the first area upon an operation on the one of the plurality of representations displayed in the first area.

19. The information-processing apparatus as claimed in claim 1, wherein the processing unit is further configured to generate the plurality of representations based on the retrieved content data in response to the first instruction.

* * * * *